(12) United States Patent
Hori et al.

(10) Patent No.: US 10,783,001 B2
(45) Date of Patent: Sep. 22, 2020

(54) INFORMATION PROCESSING DEVICE, INFORMATION PROCESSING METHOD, AND NON-TRANSITORY COMPUTER READABLE MEDIUM

(71) Applicant: SEIKO EPSON CORPORATION, Tokyo (JP)

(72) Inventors: Fumiya Hori, Ueda (JP); Chiho Tachikawa, Ueda (JP)

(73) Assignee: SEIKO EPSON CORPORATION, Tokyo (JP)

( * ) Notice: Subject to any disclaimer, the term of this patent is extended or adjusted under 35 U.S.C. 154(b) by 192 days.

(21) Appl. No.: 16/127,331

(22) Filed: Sep. 11, 2018

(65) Prior Publication Data

US 2019/0079797 A1    Mar. 14, 2019

(30) Foreign Application Priority Data

Sep. 12, 2017  (JP) ................................ 2017-175145

(51) Int. Cl.
| | |
|---|---|
| *G06F 9/46* | (2006.01) |
| *G06F 9/48* | (2006.01) |
| *G06F 3/0481* | (2013.01) |
| *G06Q 10/06* | (2012.01) |
| *G06F 9/50* | (2006.01) |
| *G06F 3/0486* | (2013.01) |

(52) U.S. Cl.
CPC .......... *G06F 9/4881* (2013.01); *G06F 3/0486* (2013.01); *G06F 3/04817* (2013.01); *G06F 9/5038* (2013.01); *G06Q 10/0633* (2013.01)

(58) Field of Classification Search
CPC .. G06F 9/4481; G06F 3/04817; G06F 3/0486; G06F 9/5038; G06F 10/0633
See application file for complete search history.

(56) References Cited

U.S. PATENT DOCUMENTS

| | | | |
|---|---|---|---|
| 8,024,405 B2 | 9/2011 | Shukla et al. | |
| 8,069,074 B2 | 11/2011 | Toyofuku et al. | |
| 9,792,079 B2 | 10/2017 | Smyth et al. | |
| 2004/0088208 A1 | 5/2004 | H. Runge et al. | |
| 2016/0310840 A1* | 10/2016 | Kyogoku | H04B 5/0031 |

FOREIGN PATENT DOCUMENTS

| | | |
|---|---|---|
| JP | 2007-188481 A | 7/2007 |
| JP | 2009-532756 A | 9/2009 |
| JP | 2014-164765 A | 9/2014 |

* cited by examiner

*Primary Examiner* — Camquy Truong
(74) *Attorney, Agent, or Firm* — Oliff PLC

(57) ABSTRACT

An information processing device configured to create an operation flow including a plurality of operation steps and specified with an order of execution of the operation steps includes an input unit configured to accept entries, a display unit, and a controller configured to cause a display to display a work region, arrange, onto the work region, objects indicative of the operation steps in accordance with the entries accepted by the input unit, and create an operation flow based on the arrangement of the objects on the work region.

11 Claims, 14 Drawing Sheets

| WORK BLOCK | SETTING CONTENT | NUMBER OF COUPLING POINTS | OBJECT | |
|---|---|---|---|---|
| SPECIFY WORK PROCEDURE | WORK NAME/WORK ID | 1 | 👉 | ← 201 |
| | CONTENT OF WORK PROCEDURE | | | |
| | WORK SETTINGS | | | |
| READ 2D CODE | READ DATA | 2 | ▦ | ← 202 |
| | RESULT OF DETERMINATION AND COUPLING POINTS | | | |
| ENTER TEXT | LIMITED NUMBER OF CHARACTERS | 2 | ⌨ | ← 203 |
| | RESULT OF DETERMINATION AND COUPLING POINTS | | | |
| PERFORM POSITIVE/NEGATIVE DETERMINATION | RESULT OF DETERMINATION AND COUPLING POINTS | 2 | o\|× | ← 204 |
| SELECT CHECK BOX | NUMBER OF CHECK BOXES | 3 | ☑ | ← 205 |
| | TEXT TO BE DISPLAYED | | | |
| SELECT RADIO BUTTON | NUMBER OF RADIO BUTTONS | 7 | ⊙ | ← 206 |
| | TEXT TO BE DISPLAYED | | | |
| END | — | 0 | ↓ | ← 207 |

INFORMATION PROCESSING DEVICE, INFORMATION PROCESSING METHOD, AND NON-TRANSITORY COMPUTER READABLE MEDIUM

BACKGROUND

1. Technical Field

The disclosure relates to an information processing device, an information processing method, and a non-transitory computer readable medium.

2. Related Art

Hitherto, work flows have been further utilized as methods for integrating, into a system, know-bows and procedures including operations and processes. The work flow generally includes information defining a procedure of various processes to be executed as an operation, as well as includes contents of the processes, and is referred to as a business operation flow or an operation flow. It is conceivable that, as an example, a device configured to edit the work flow used to evaluate quality improvements about production manufacturing has been proposed (e.g., see JP-A-2007-188481). With the configuration of JP-A-2007-188481, a user who operates a client personal computer (PC) uses a function of a work flow creation program to create or edit a business flow.

In JP-A-2007-188481, the user selects icons of engines indicative of processes and the like drags and drops the selected icons onto a matrix, and arranges the engines on the matrix. In this example, an order of execution of engines arranged on a matrix is determined from left to right and top to bottom of the matrix, and thus a work flow is created.

Incidentally, some processes and operations configuring an operation flow limit some other processes and operations to be executed later. For example, in some processes and operations, any of two or more sub-processes and sub-operations are to be consecutively executed. A process and an operation might be combined, which cannot be consecutively executed. In this case, when creating or editing an operation flow, a user takes into account, in addition to an order of execution of processes and operations, limitations about consecutive processes and operations. A highly skilled user normally creates and edits an operation flow. A reduced burden to such a user has been demanded.

The disclosure is a result of consideration of the situation described above, and an advantage is that an appropriate operation flow including a plurality of operations and the like can be easily created or edited.

SUMMARY

An information processing device configured to create an operation flow including a plurality of operation steps, the operation flow being specified with an order of execution of the plurality of operation steps, according to the disclosure, includes an input unit configured to accept entries, a display unit configured to cause a display face to perform displaying, and a controller configured to cause the display face to display a work region, arrange objects indicative of the plurality of operation steps onto the work region in accordance with the entries accepted by the input unit, and create the operation flow based on the arrangement of the objects on the work region. The controller, determines whether acceptable or unacceptable by comparison of the objects arranged on the work region with a condition set with respect to the plurality of operation steps respectively corresponding to the objects, adds, when unacceptable is determined, a display indicative of condition unacceptability onto each of corresponding ones of the objects, and continues, after adding the display indicative of condition unacceptability onto each of the corresponding ones of the objects, arranging the objects onto the work region in accordance with the entries.

With the disclosure, when a user makes entries to arrange objects onto the work region, if one of the objects being arranged is found unacceptable to the condition set with respect to the operation steps, the unacceptability can be notified with the display. By making entries to cause the display indicative of condition unacceptability to disappear, the user easily creates or edits an operation flow satisfying the condition. Even when unacceptable is determined, the user can continue arranging objects. The user thus makes an entry to solve the unacceptability at a desired timing. Convenience in creating or editing an operation flow can be improved.

The controller may be of a configuration to create the operation flow that includes the plurality of operation steps respectively corresponding to the objects arranged on the work region, and that is specified with the order of execution of the plurality of operation steps, in accordance with an order of the arrangement of the objects.

With the disclosure, the user makes entries, arranges objects onto the work region, and creates an operation flow corresponding to an order of the arrangement of the objects. By arranging objects, the user easily creates or edits an operation flow.

In the disclosure, the controller may be of a configuration to execute a processing to add information or an attribute for the objects arranged on the work region in accordance with entries, and may determine, when one of the objects arranged on the work region is not added with the information or the attribute of a set type, the one of the objects as condition unacceptable.

With the disclosure, when condition unacceptable is determined for adding information or an attribute for objects, the user can be notified with the unacceptability. The user is supported for adding information or an attribute for objects. Therefore, the user can easily create or edit an appropriate operation flow.

In the disclosure, one of the plurality of operation steps may be at least one of processing of outputting of information, entering of information, and making a determination each executed by a computer, and the controller may be of a configuration to cause icons, which are indicative of processing of the plurality of the operation steps respectively corresponding to the objects, to be associated with the objects arranged on the work region, and to be displayed.

With the disclosure, by displaying icons on objects on the work region, a user can easily recognize computer processing represented by operation steps. The user thus easily creates or edits an appropriate operation flow.

In the disclosure, one of the plurality of operation steps may be at least one of processing of outputting of information, of entering of information, and of making a determination each executed by a computer, and the controller may be of a configuration to cause icons, which are indicative of processing of the plurality of operation steps respectively corresponding to the objects, to be associated with the objects arranged on the work region, and to be displayed, as well as may compare the objects arranged on the work region with the condition set in association with processing of the plurality of operation steps respectively corresponding to the objects, and may determine whether acceptable or unacceptable.

With the disclosure, icons are displayed on objects on the work region. When one of the objects is determined as condition unacceptable, a display indicative of unacceptability is provided. The user thus easily recognizes a process represented by an operation step and its acceptability based on the display. By taking into account contents of operation steps and a condition set for the operation steps, the user creates or edits an appropriate operation flow.

In the disclosure, the controller may be of a configuration to cause the display face to display an information input region configured to accept entries of information about the plurality of operation steps, and may cause, when one of the plurality of operation steps respectively corresponding to the objects arranged on the work region is determined as condition unacceptable, the information input region to perform at least either of providing the display of condition unacceptability or changing a display aspect of the information input region.

With the disclosure, while the information input region configured to accept entries of information about operation steps is displayed, when one of the operation steps corresponding to objects is determined as condition unacceptable, the information input region can provide the display to notify the condition unacceptability. The user thus easily recognizes acceptability of an operation step based on the display to solve condition unacceptability. By taking into account contents of operation steps and a condition set for the operation steps, the user creates or edits an appropriate operation flow.

In the disclosure, the controller may be of a configuration to add information about the objects added with the display indicative of condition unacceptability, to operation flow data, the operation flow data being used by the computer to execute the operation flow created based on the arrangement of the objects on the work region, and may output the operation flow data as data described in a format specified beforehand.

With the disclosure, in accordance with objects arranged on the work region, an operation flow to be executed by a computer can be created, and information indicative of condition unacceptability can be added to data of the operation flow. Thus, the created operation flow can be processed and output as data by another computer. The data allows the computer to detect condition unacceptability.

In the disclosure, the controller may be of a configuration to execute, in accordance with an entry accepted by the input unit, a condition setting process configured to set a condition relating to the plurality of operation steps, may compare, in accordance with the condition set in the condition setting process, the plurality of operation steps respectively corresponding to the objects arranged on the work region with the set condition, and may determine whether acceptable or unacceptable.

With the disclosure, after a condition is set for an operation step, and when the set condition is not satisfied, the display indicative of unacceptability is provided. Thus, a user sets a detailed condition relating to an operation flow, as well as easily creates or edits the operation flow satisfying the set condition.

In the disclosure, a storage unit may be further included, and the controller may be of a configuration to cause the storage unit to store condition definition information indicative of the condition set in the condition setting process.

With the disclosure, once a condition is set based on condition definition information, the condition can be used consecutively in creating or editing an operation flow.

In the disclosure, an information processing method of creating an operation flow by using an information processing device equipped with a display unit, the operation flow including a plurality of operation steps, and being specified with an order of execution, includes causing the display unit to display a work region, arranging, in accordance with entries, objects indicative of the plurality of operation step onto the work region, creating the operation flow based on the arrangement of the objects on the work region, comparing the objects arranged on the work region with a condition set with respect to the plurality of operation steps respectively corresponding to the objects, determining whether acceptable or unacceptable, adding, when unacceptable is determined, a display indicative of condition unacceptability onto each of corresponding ones of the objects, and continuing, after the display indicative of condition unacceptability is added on each of the corresponding ones of the objects, arranging the objects onto the work region in accordance with entries.

With the disclosure, when a user makes entries to arrange objects onto the work region, if one of the objects being arranged is found unacceptable to the condition set with respect to the operation steps, the unacceptability can be notified with the display. By making entries to cause the display indicative of condition unacceptability to disappear, the user easily creates or edits an operation flow satisfying the condition. Even when unacceptable is determined, the user can continue arranging objects. The user thus makes an entry to solve the unacceptability at a desired timing. Accordingly, convenience in creating or editing an operation flow is improved.

In the disclosure, a non-transitory computer readable medium storing a program for causing, as a controller, a computer equipped with a display unit to execute a process configured to create an operation flow including a plurality of operation steps and specified with an order of execution, the process including causing the display unit to display a work region, arranging, in accordance with entries, objects indicative of the plurality of operation steps onto the work region, creating the operation flow based on the arrangement of the objects on the work region, comparing the objects arranged on the work region with a condition set with respect to the plurality of operation steps respectively corresponding to the objects, determining whether acceptable or unacceptable, adding, when unacceptable is determined, a display indicative of condition unacceptability onto each of corresponding ones of the objects, and continuing, after the display indicative of condition unacceptability is added onto each of the corresponding ones of the objects, arranging the objects onto the work region in accordance with the entries.

With the disclosure, when a user makes entries to arrange objects onto the work region, if one of the objects being arranged is found unacceptable to the condition set with respect to the operation steps, the unacceptability can be notified with the display. By making entries to cause the display indicative of condition unacceptability to disappear, the user easily creates or edits an operation flow satisfying the condition. Even when unacceptable is determined, the user can continue arranging objects. The user thus makes an entry to solve the unacceptability at a desired timing. Accordingly, convenience in creating or editing an operation flow is improved.

BRIEF DESCRIPTION OF THE DRAWINGS

Embodiments of the disclosure will be described with reference to the accompanying drawings, wherein like numbers reference like elements.

FIG. 6 is a schematic view of condition definition information.

DESCRIPTION OF EXEMPLARY EMBODIMENTS

Hereinafter, an exemplary embodiment applied with the disclosure will be described with reference to the accompanying drawings.

Figure 1:
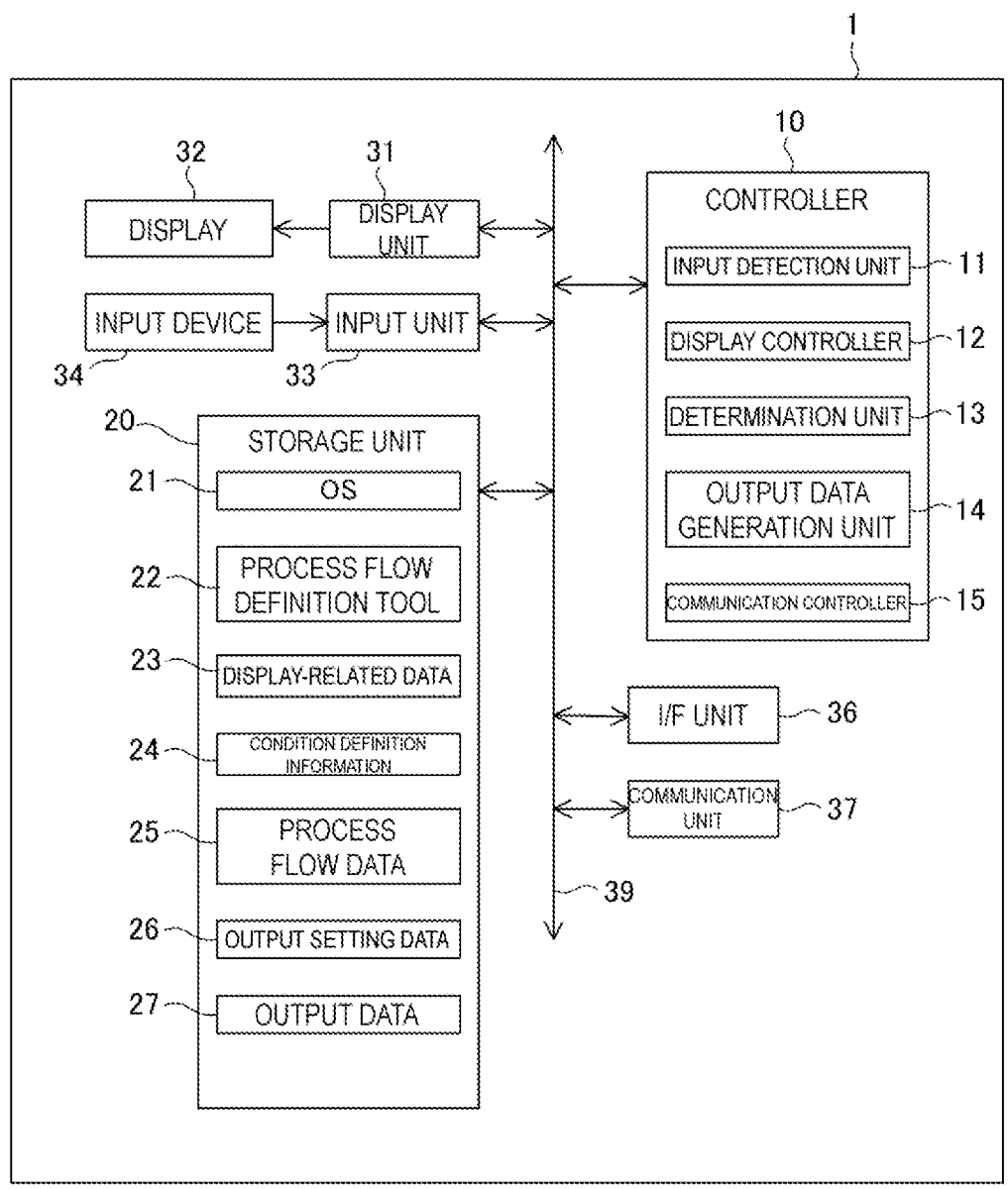
FIG. 1 is a function block diagram of a PC.

FIG. 1 is a function block diagram of a personal computer (PC) 1 applied with an information processing device according to the disclosure. The PC 1 includes a display 32 and an input device 34, described later, as long as the PC 1 may be a computer operable by a user, a specific configuration of the PC 1 is not limited. For example, the PC 1 may be a desktop computer, and may be a portable computer, such as a laptop computer, or a tablet computer. As long as the PC 1 includes functions illustrated in FIG. 1, the PC 1 may be a small device, such as a smart phone.

As illustrated in FIG. 1, the PC 1 includes a controller 10, a storage unit 20, a display unit 31, an input unit 33, an interface (I/F) unit 36, and a communication unit 37, these are coupled to each other via a bus 39. The controller 10 includes a processor, such as a central processing unit (CPU), and is configured to control the PC 1, by execution of a program by the processor, and to achieve various functions of the PC 1. The controller 10 may include a random access memory (RAM) configured to prepare a work area for the processor. The controller 10 may include a read-only memory (ROM) configured to store in a non-volatile manner a basic control program executed by the processor.

The controller 10 is configured to execute a program and to operate together with software and hardware to achieve functional units, such as an input detection unit 11, a display controller 12, a determination unit 13, an output data generation unit 14, and a communication controller 15. Functions of the functional units of the controller 10 will be described later.

The storage unit 20 includes a magnetic storage medium, an optical storage medium, or a semiconductor storage device and the like, and has a storage region used to store programs and data. The storage unit 20 is configured to store in a non-volatile manner programs to be executed by the controller 10 and data to be processed by the controller 10. Programs and data stored in the storage unit 20 will be described later.

The display unit 31 is coupled to the display 32 (display face), and is configured to cause the display 32 to display various screens with text and/or images in accordance with a control by the controller 10.

The display 32 includes a liquid crystal display device, an organic electro luminescence (EL) display device, or another display device, and is driven by the display unit 31.

The input unit 33 is coupled to the input device 34, and is configured to detect an operation of the input device 34, and to accept an entry through the operation of the input device 34. The input unit 33 outputs, to the controller 10, data indicative of a content of the entry through the input device 34.

The input device 34 may be a text input device, such as a keyboard, or a pointing device, such as a mouse, a digitizer, or a pen tablet. The input device 34 may be a configuration integrated with the display 32, such as a touch panel. The input device 34 may be a software keyboard or a graphical user interface (GUI) incorporated into a screen displayed on the display 32.

The interface (I/F) unit 36 is an interface used to couple an external device, such as a storage device, to the PC 1, and includes a universal serial bus (USB) interface, for example. The I/F unit 36 exchanges data with the external device coupled to the I/F unit 36 in accordance with a control by the controller 10.

The communication unit 37 is configured to execute wired or wireless communications with the external device attached to the PC 1 in accordance with a control by the controller 10. The communication unit 37 executes communications in accordance with various protocols, such as an Ethernet (registered trademark) protocol, a wireless LAN (including Wi-Fi (registered trademark)), and a Bluetooth (registered trademark).

As examples of programs and data to be stored in the storage unit 20, FIG. 1 illustrates an operating system (OS) 21, a process flow definition tool 22, display-related data 23, condition definition information 24, process flow data 25, output setting data 26, and output data 27. The operating system (OS) 21 is a control program used by the controller 10 to control the PC 1, and configures a platform allowing the controller 10 to operate an application program. When the controller 10 executes the OS 21, a basic function of the PC 1 is provided as an application program interface (API) for the application program to be executed by the controller 10. The basic function of the PC 1 includes a display process to be executed by the display unit 31, an input detection process to be executed by the input unit 33, a data input and output process to be executed by the I/F unit 36, a communication process to be executed by the communication unit 37, and other processes, for example.

The process flow definition tool 22 is an application program used to create and edit a process flow with the PC 1. When the controller 10 executes the process flow definition tool 22, an operation flow to be executed by a work terminal 5 (FIG. 2), described later, can be created and edited. A process flow created by the process flow definition tool 22 is a specific example of an operation flow.

Here, an operation flow created and edited with the PC 1 will now be described.

An operation flow includes a basic operation or a plurality of basic operations (also referred to as unit of operation), and represents a sequence in which an order of execution of the basic operations is defined. A basic operation corresponds to an operation step in the disclosure, and represents a process, such as outputting of information on a display, entering of information onto the display, and making a determination. A unit of operation is used as a unit when creating and editing an operation flow. The unit of operation does not intend to limit any particular. Specifically, when an operation flow is created and edited, a content of the basic operation is not edited. Excluding this point of view, the basic operation is not limited. Accordingly, a content of a basic operation may be determined as desired for convenience of editing an operation flow. A basic operation may contain a plurality of operations or processes, for example.

One specific example of an operation flow is a business operation flow (so-called work flow) representing an operation including a plurality of tasks. A business operation flow includes a plurality of tasks performed by an operator to achieve a set object, and includes a process configured to output information to the operator who is engaging the plurality of tasks. One unit of work performed by an operator and one output of information to the operator each corresponds to an operation step in an operation flow.

As an example of an operation flow, how the PC 1 creates and edits a process flow will now be described. In this example, a process flow that is a kind of work flow is created. The process flow includes a work block as a basic operation. A process flow to be created with the PC 1 can include, as a work block, a process configured to display a screen with an image and/or text, as an output of information to an operator. As work blocks, various processes can be included, such as reading of a two-dimensional code (2D code), such as a QR code (registered trademark), entering of text, and making a determination of whether positive or negative (hereinafter referred to as positive/negative determination). As work blocks, entering of a selection using a check box (hereinafter referred to as selection of check box) and entering of a selection using a radio button (hereinafter referred to as selection of radio button) are also included. In a process flow, a work block of "end" is placed at a terminal of the process flow. As described above, work blocks may include a plurality of processes.

The display-related data 23 includes data of images and/or text to be displayed by the display unit 31 when the controller 10 executes the process flow definition tool 22. When the controller 10 executes the process flow definition tool 22, the controller 10 refers to the display-related data 23, and causes the display 32, via the display unit 31, to display an image and/or text based on the display-related data 23.

The condition definition information 24 is information defining conditions with respect to work blocks included in a process flow, and includes information of some or all of work blocks to be created or edited upon the process flow definition tool 22 is executed. A condition with respect to a work block refers to a condition to be set with respect to a content of the work block. For example, note that a work block corresponding to an entry of information be set with a format of information to be entered, an entry method, and an action when no entry is made, for example. The condition definition information 24 is set with how to define, as a condition for a work block corresponding to an entry of information, a format of information to be entered, an entry method, and an action when no entry is made. The condition definition information 24 will be described later in detail with reference to FIG. 6.

The process flow data 25 is data of a process flow generated when the controller 10 has executed the process flow definition tool 22. The process flow data 25 includes work blocks included in the process flow, an order of execution of the work blocks, and setting contents including entries with respect to the work blocks, and may include other information. The process flow data 25 has a data format that can be interpreted when the controller 10 executes the process flow definition tool 22. When the controller 10 executes the process flow definition tool 22, the controller 10 can read the process flow data 25 from the storage unit 20, and can edit a process flow represented by the process flow data 25 that is read. In this case, based on the edited process flow, the controller 10 can update the process flow data 25 stored in the storage unit 20.

The output setting data 26 is data relating to a setting when the process flow data 25 is converted into the output data 27. The output data 27 (operation flow data) is, in the PC 1 or a device other than the PC 1, data used to execute a process flow by following the process flow data 25, and differs in data format and the like from the process flow data 25.

In the exemplary embodiment, as an example of a device configured to execute a process flow created with the PC 1, the work terminal 5 (FIG. 2) will be described. The work terminal 5 is a terminal device used by an operator who is engaging an operation based on a process flow.

The controller 10 executes the process flow definition tool 22 to generate (convert) the output data 27 from the process flow data 25. In other words, the process flow definition tool 22 is a program having a function of generating the output data 27.

The output data 27 is data interpretable and executable by the work terminal 5, and is described in a general-purpose data format, for example. A general-purpose data format refers to a data format that can be processed by the work terminal 5 via a web browser, for example. Specifically, general-purpose data is data described in Extensible Markup Language (XML) or Hypertext Markup Language (HTML) and the like.

The output data 27 may be general-purpose data used to execute a process flow in various devices including general-purpose devices, such as PCs. The output data 27 may be data corresponding to one of a type, a configuration, and a specification of a device used to execute a process flow. For example, the output data 27 conforming to a device equipped with a camera may be the output data 27 that specifies performing text recognition using image data captured by the camera, as a method for entering information. When the output data 27 is executed by a device equipped with a camera, an operator uses the camera to easily make an entry with fewer burdens. The output data 27 conforming to a device equipped with a bar-code reader may be data that specifies acquiring data read by the bar-code reader, as a method for entering information.

The output data 27 may be data conforming to a device equipped with a head mounted display unit (head mounted display device) attached to a head of an operator. In the output data 27 conforming to a head mounted display device, a background color of a screen to be displayed, resolution of the screen, sizes of images and/or text to be displayed on the screen and the like may be adjusted so as to reduce a burden on a visual function of an operator attached with the head mounted display device. For example, the output data 27 conforming to a head mounted display device equipped with a see-through type display unit that allows a user to see a scene in a transparent manner may differ in background color, for example, from the output data 27 conforming to a head mounted display device equipped with a closed type display unit that shields external light.

The output setting data 26 includes data specifying a data format for the output data 27. The output setting data 26 may include data instructing a change of data included in the process flow data 25. For example, when the output data 27 is generated in accordance with a type, a configuration, or a specification of a device used to execute a process flow, the output setting data 26 is stored in the storage unit 20 per a type, a configuration, or a specification of the device conforming to the output data 27. In this case, while the controller 10 is executing the process flow definition tool 22, the controller 10 generates the output data 27 in accordance with the output setting data 26 selected from other pieces of the output setting data 26 stored in the storage unit 20.

The controller 10 can output the output data 27 via the I/F unit 36 or the communication unit 37. The controller 10 copies the output data 27 to a storage device coupled to the I/F unit 36, for example. For example, the communication unit 37 may send the output data 27 to an external device.

The input detection unit 11 included in the controller 10 is configured to detect an entry by a user of the PC 1 based on data entered via the input unit 33. For example, when the controller 10 executes the process flow definition tool 22, the input detection unit 11 detects text and a drag and drop operation entered via the input device 34.

The display controller 12 is configured to control and cause the display unit 31 to display various screens. For example, when the controller 10 executes the process flow definition tool 22, the display controller 12 causes, for example, the editing screen 101 (FIG. 4) and the details setting screen 151 (FIG. 10), described later, to be displayed.

The determination unit 13 corresponds to a function of the controller 10 executing the process flow definition tool 22, and is configured to determine a state of a work block when a process flow is created. Specifically, the determination unit 13 determines whether a work block included in a process flow satisfies or not a condition defined in the condition definition information 24.

The output data generation unit 14 is configured to perform a process configured to refer to the output setting data 26, and to generate the output data 27 from the process flow data 25.

The communication controller 15 is configured to control the communication unit 37 to execute communications with another device than the PC 1. The communication controller 15 sends the output data 27 stored in the storage unit 20 to an external device, for example.

Figure 2:
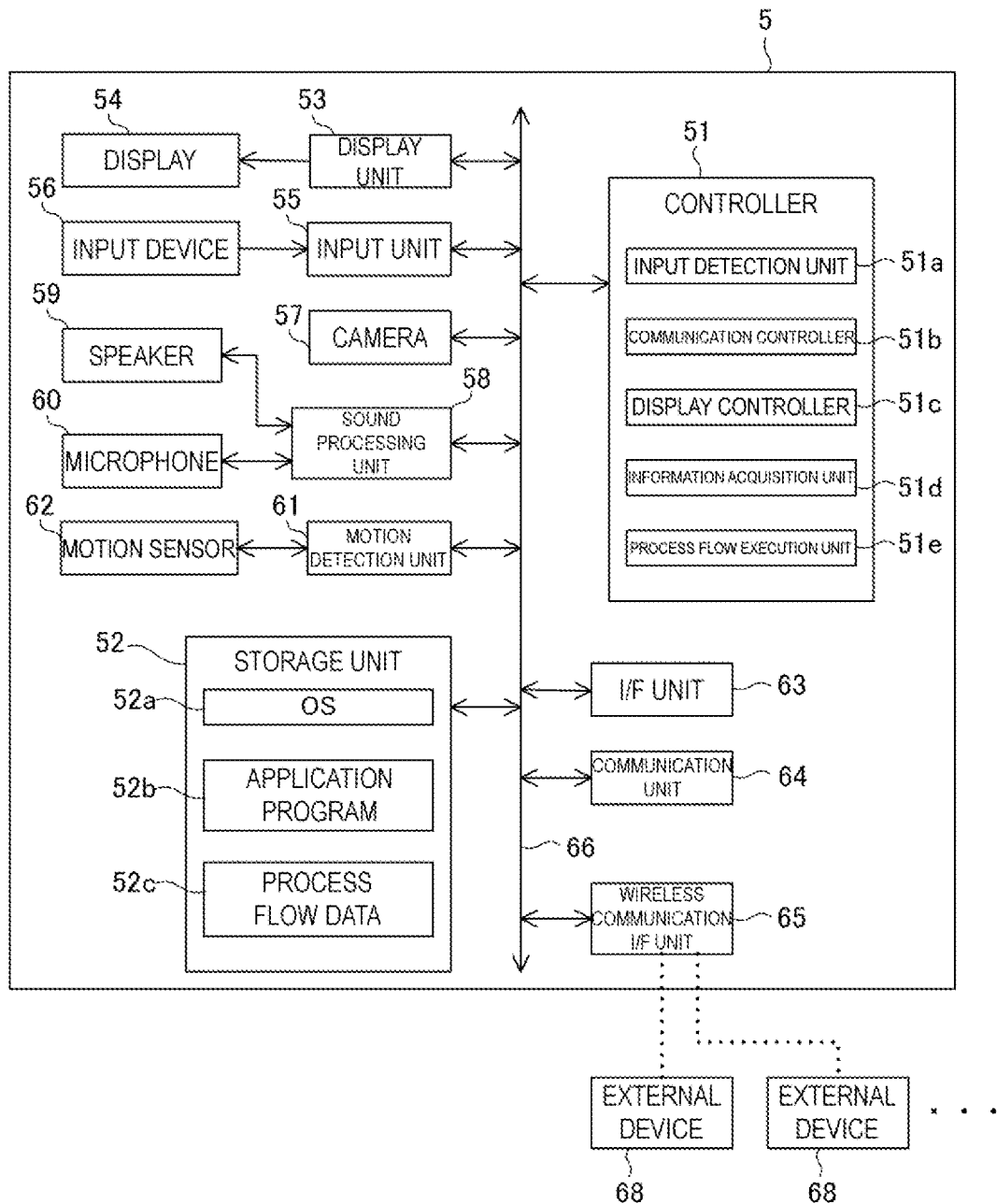
FIG. 2 is a function block diagram of a work terminal.

FIG. 2 is a function block diagram of the work terminal 5.

The work terminal 5 includes a display 54 and an input device 56, and is a terminal device used by an operator who is engaging an operation in accordance with a process flow. As long as the work terminal 5 is a computer, although a specific configuration of the work terminal 5 is not limited, and it is advantageous to be a portable device, such as a laptop computer, a tablet computer, or a smart phone and the like.

As illustrated in FIG. 2, the work terminal 5 includes a controller 51, a storage unit 52, a display unit 53, an input unit 55, an I/F unit 63, and a communication unit 64, all of which are coupled to each other via a bus 66.

The controller 51 includes a processor, such as a CPU, and is configured to allow the processor to execute a program to control the work terminal 5, and to achieve various functions of the work terminal 5. The controller 51 may include a RAM configured to prepare a work area for the processor. The controller 51 may include a ROM configured to store in a non-volatile manner a basic control program executed by the processor.

The controller 51 is configured to execute a program and to operate together with software and hardware to achieve functional units, such as an input detection unit 51*a*, a communication controller 51*b*, a display controller 51*c*, an information acquisition unit 51*d*, and a process flow execution unit 51*e*. Functions of the functional units of the controller 51 will be described later.

The storage unit 52 includes a magnetic storage medium, an optical storage medium, or a semiconductor storage device and the like, and has a storage region used to store programs and data. The storage unit 52 is configured to store in a non-volatile manner programs to be executed by the controller 51 and data to be processed by the controller 51. Programs and data stored in the storage unit 52 will be described later.

The display unit 53 is coupled to the display 54, and is configured to cause the display 54 to display various screens with text and/or images in accordance with a control by the controller 51.

The display 54 is a liquid crystal display device, an organic EL display device, or other display device, and is driven by the display unit 53.

The display 54 may be a head mounted type display attached to a head of an operator. In this case, the work terminal 5 corresponds to a head mounted display (HMD) device. In this case, the display 54 may be a see-through type display unit that allows an operator to see a scene in a transparent manner. The display 54 may otherwise be a closed type display unit that shields external light.

The input unit 55 is coupled to the input device 56, and is configured to detect an operation of the input device 56, and to output to the controller 51, operation data indicative of a content of the operation.

The input device 56 is an input device, such as a keyboard, a mouse, a digitizer, a pen tablet, or a touch pad. The input device 56 may be a configuration integrated with the display 54, such as a touch panel. The input device 56 may be a software keyboard or a graphical user interface (GUI) incorporated into a screen displayed on the display 54.

A camera 57 is a digital camera equipped with an imaging element, such as a charge coupled device (CCD) image sensor or a complementary metal oxide semiconductor (CMOS) image sensor. The camera 57 is configured to capture an image in accordance with a control by the controller 51 and to output imaging data to the controller 51.

A sound processing unit 58 is coupled to a speaker 59 and a microphone 60. The sound processing unit 58 is configured to cause the speaker 59 to output sound in accordance with a control by the controller 51. Also, the sound processing unit 58 detects sound collected by the microphone 60 in accordance with a control by the controller 51. The sound processing unit 58 outputs, to the controller 51, sound data representing the sound collected by the microphone 60.

The speaker 59 includes an analog or stereo speaker provided on a main body of the work terminal 5, or a headphone. The microphone 60 may be provided on the main body of the work terminal 5, or may be a microphone coupled to the work terminal 5 in a wired or wireless manner. For example, the speaker 59 and the microphone 60 may be integrated into a headset.

A motion detection unit 61 is coupled to a motion sensor 62, and is configured to output data indicative of a detection value of the motion sensor 62 to the controller 51. The motion sensor 62 is a sensor configured to detect a motion of the work terminal 5 or a motion of an operator attached with and/or using the work terminal 5, and includes an acceleration sensor, an angular velocity sensor (gyro sensor), and a geomagnetic sensor and the like. The motion sensor 62 may be a sensor unit equipped with a plurality of sensors, and may be an inertial measurement unit (IMU), for example. The work terminal 5 may include various sensors, such as a vibration sensor and a body motion sensor. In this case, the various sensors may be coupled to the motion detection unit 61, for example. Detection values of the various sensors may be acquired by the input unit 55 as input values.

The work terminal 5 may include a position detection unit (not shown) configured to detect a position of the work terminal 5 based on a global positioning system (GPS). In this case, the motion detection unit 61 may be coupled to the position detection unit, may acquire a position of the work terminal 5 detected by the position detection unit, and may output position data to the controller 51.

The I/F unit 63 is an interface used to couple an external device, such as a storage device, to the work terminal 5, and includes a USB interface, for example. The I/F unit 63 exchanges data with the external device coupled to the I/F unit 63 in accordance with a control by the controller 51.

The communication unit 64 is configured to execute wired or wireless communications with the external device attached to the work terminal 5 in accordance with a control by the controller 51. The communication unit 64 executes communications in accordance with various protocols, such as an Ethernet protocol and a wireless LAN (including Wi-Fi).

A wireless communication I/F unit 65 is configured to execute wireless communications with the external device attached to the work terminal 5. The wireless communication I/F unit 65 executes, in particular, wireless communications in a close range based on Bluetooth, near field radio communication (NFC), and Zigbee (registered trademark) and the like. An external device 68 is a device configured to perform wireless communications with the wireless communication I/F unit 65. The external device 68 is not particularly limited in number. A plurality of the external devices 68 are capable of being coupled to the wireless communication I/F unit 65. The external device 68 is a bar-code reader configured to optically read one-dimensional bar-code, for example. The external device 68 may be an input device including a keyboard and a mouse, as well as may be a card reader, a data storage device, or a smart phone and the like.

As examples of programs and data stored in the storage unit 52, FIG. 2 illustrates an OS 52a, an application program 52b, and process flow data 52c. The OS 52a is a control program used by the controller 51 to control the work terminal 5, and configures a platform allowing the controller 51 to operate the application program 52b. When the controller 51 executes the OS 52a, a basic function of the work terminal 5 is provided as an API for the application program 52b. The basic function of the work terminal 5 includes a display process to be executed by the display unit 53, an input detection process to be executed by the input unit 55, a data input and output process to be executed by the I/F unit 63, a communication process to be executed by the communication unit 64, and other processes, for example.

The application program 52b is a program configured to allow the work terminal 5 to execute a process flow created with the PC 1. The application program 52b may be a special application program configured to execute a process flow, or may be a general-purpose program, such as a web browser. A specific configuration of the application program 52b can be selected as desired in conformity to a specification of the process flow data 52c, described later.

The process flow data 52c is data of a process flow created with the PC 1, and corresponds to the output data 27 output from the PC 1. The controller 51 is configured to acquire the output data 27 created with the PC 1, and to cause the storage unit 52 to store the output data 27 as the process flow data 52c. The process flow data 52c may be data conforming to a specification of the work terminal 5. For example, the process flow data 52c may be data of a process flow including work blocks in which the camera 57 and the motion sensor 62 are used. The process flow data 52c may be general-purpose data executable by various devices including the work terminal 5 (e.g., a device without the camera 57) and the work terminal 5 with a different type or specification.

When the controller 51 executes the application program 52b, the controller 51 reads the process flow data 52c, and further executes work blocks included in the process flow data 52c.

The input detection unit 51a included in the controller 51 is configured to detect an entry by an operator of the work terminal 5 based on data entered from the input unit 55.

The communication controller 51b is configured to control the communication unit 64 to execute communications with other device than the work terminal 5. The communication controller 51b is configured to execute communications with the PC 1, to receive the output data 27 from the PC 1, and to cause the storage unit 52 to store the output data 27 as the process flow data 52c, for example.

The display controller 51c is configured to control the display unit 53 to display various screens. For example, when the controller 10 executes the application program 52b, the display controller 51c causes various screens respectively corresponding to work blocks to be displayed.

The information acquisition unit 51d is configured to execute various tasks, such as reading of data with the I/F unit 63. When a storage device coupled to the I/F unit 63 is detected, the information acquisition unit 51d reads data from the storage device, and causes the storage unit 52 to store the data, for example. The work terminal 5 can thus read and use the process flow data 52c stored in the storage device.

The process flow execution unit 51e is configured to execute the application program 52b stored in the storage unit 52, and to further execute a process flow in accordance with the process flow data 52c.

Figure 3:
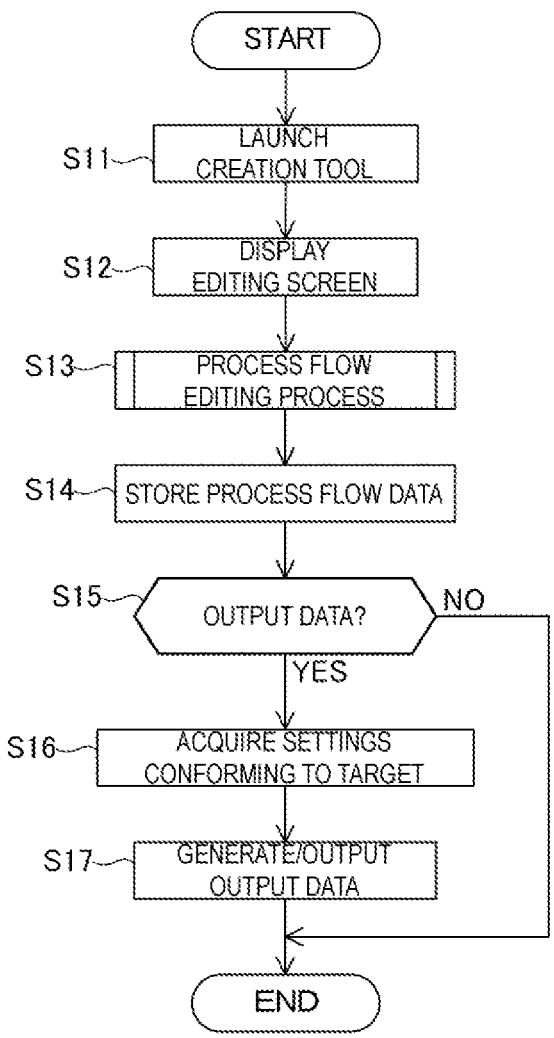
FIG. 3 is a flowchart illustrating an operation of the PC.

FIG. 3 is a flowchart illustrating an operation of the PC 1.

The operation in FIG. 3 is executed while the controller 10 is executing the OS 21.

In response to an operation by a user, for example, the controller 10 reads the process flow definition tool 22 from the storage unit 20 and launches the process flow definition tool 22 (step S11). The controller 10 reads the display-related data 23, and causes the display unit 31 to display an editing screen arranged with an image and the like included in the display-related data 23 (step S12).

Figure 4:
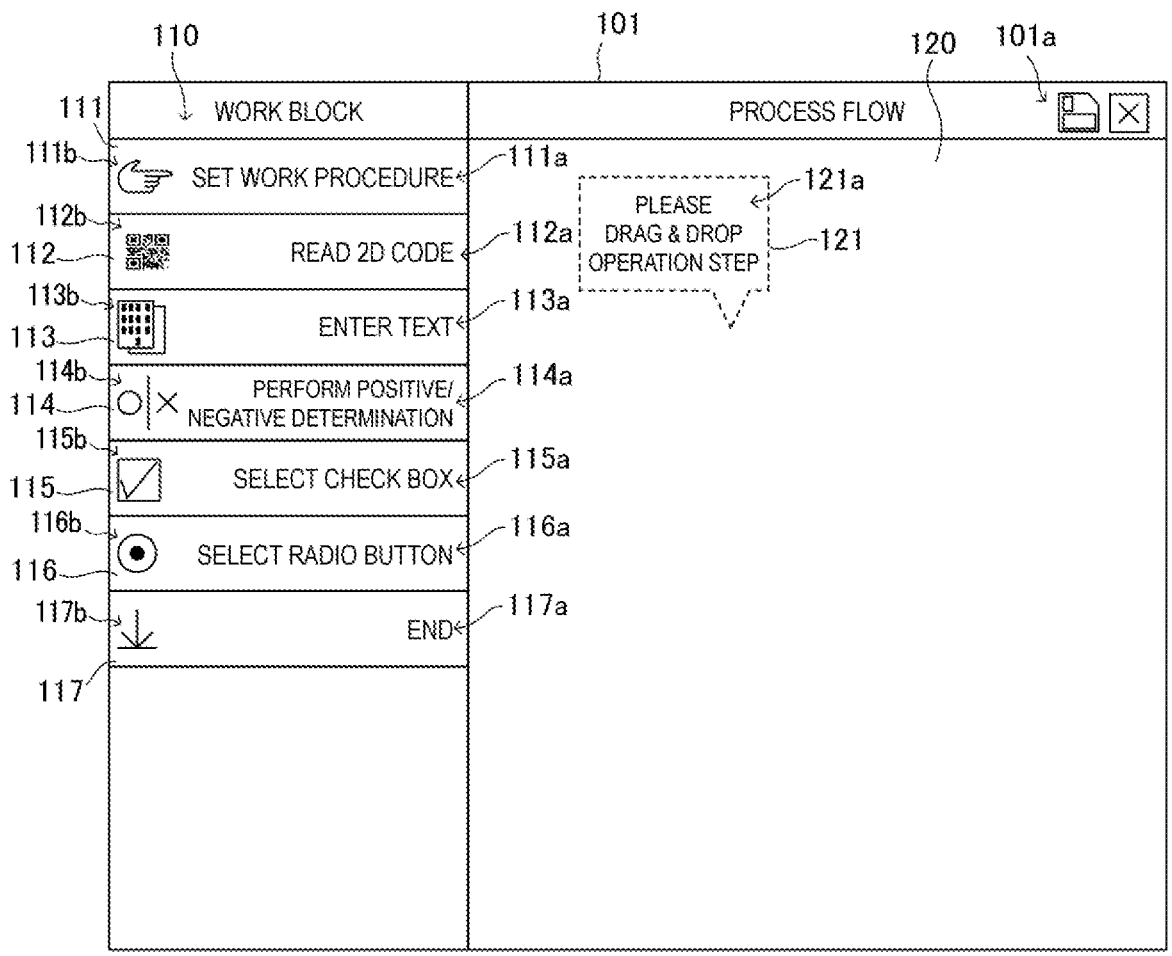
FIG. 4 is a view illustrating a display example of the PC.

FIG. 4 is a view illustrating a display example of the PC 1, and illustrates a configuration example of an editing screen 101. FIG. 4 illustrates a view of a state of the editing screen 101 at a point of time when creating or editing of a process flow is started. The state corresponds to a state immediately after the editing screen 101 is displayed in step S12 (FIG. 3), for example.

The editing screen 101 is a screen displayed through a function of the process flow definition tool 22 for creating and editing a process flow. The editing screen 101 is roughly separated into a candidate region 110 and an editing region 120 (work region).

At an upper section of the editing screen 101, an instruction section 101a is arranged. The instruction section 101a includes an icon instructing end of creating and editing of a process flow, as well as including an icon instructing storing the process flow.

The candidate region 110 displays a list of work blocks that can be incorporated into a process flow to be created or edited. The candidate region 110 is arranged with, in regions separated per work block, text describing each of the work blocks, and icons that are images representing symbols indicative of the work blocks.

For example, in the editing screen 101 in FIG. 4, the candidate region 110 is arranged with, in line with seven work blocks, work block display sections 111, 112, 113, 114, 115, 116, and 117. The work block display section 111 includes a work block description display section 111a as text describing that the section corresponds to a work block to which a work procedure is to be set, and an icon 111b indicative of the work block. Similarly, the work block display sections 112, 113, 114, 115, 116, and 117 respectively include work block description display sections 112a, 113a, 114a, 115a, 116a, and 117a. The work block display sections 112, 113, 114, 115, 116, and 117 also respectively include icons 112b, 113b, 114b, 115b, 116b, and 117b. The icons 111b to 117b respectively have different images so that the work block display sections 111 to 117, so as to be visually identified. Advantageously, the icons are respectively images representing contents of work blocks.

The work block description display sections 111a to 117a may respectively be names of work blocks, or may respectively be text simply describing contents of the work blocks.

The work block display sections 111 to 117 arranged on the candidate region 110 are candidate work blocks to be incorporated into a process flow to be created and edited. A user can operate the input device 34 to select any of the work block display sections 111 to 117, to drag and drop the selected ones onto the editing region 120, and to incorporate desired work blocks into a process flow.

The editing region 120 is a display region used to display a process flow. The editing region 120 is arranged with work blocks selected by the user from among the work block display sections 111 to 117 arranged on the candidate region 110. A process flow is created with one work block or a plurality of work blocks arranged on the editing region 120. The editing region 120 is arranged with objects represented by images corresponding to work blocks, as will be described later.

Figure 5:
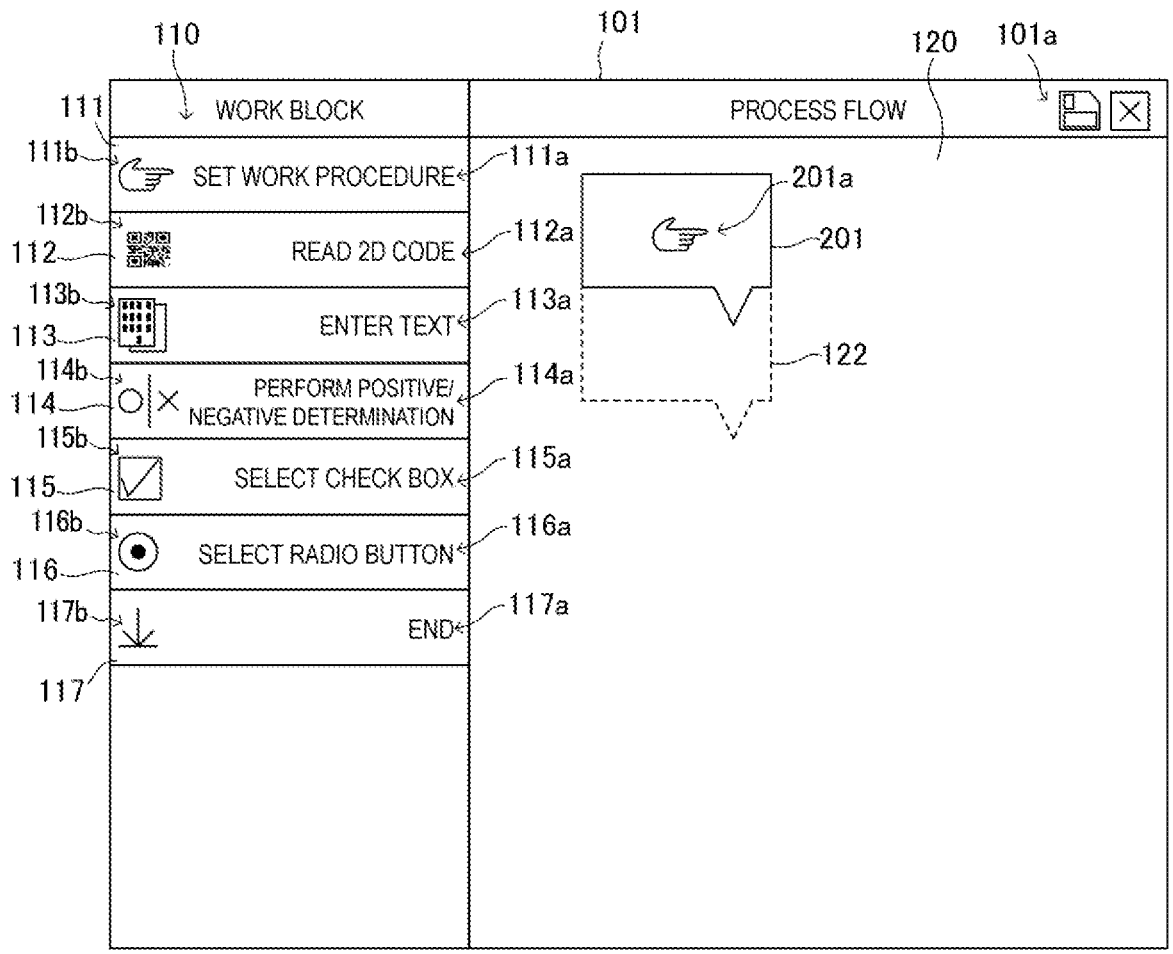
FIG. 5 is a view illustrating a display example of the PC.

FIG. 5 is a view illustrating a display example of the PC 1, and illustrates a configuration example of the editing screen 101. FIG. 5 illustrates a state in which a process flow is being created or edited.

In the state in FIG. 5, the editing region 120 of the editing screen 101 is arranged with an object 201. The object 201 is an object dragged and dropped from the work block display section 111, and represents the work block in the work block display section 111. The object 201 includes an icon 201a with an image identical to the image of the icon 111b. With the icon 201a, the object 201 representing the work block in the work block display section 111 is easily and visually identified. The object 201 may have a desired shape. In the example illustrated in FIG. 5, however, the object 201 partially has a downward arrow shape indicating an order of execution of work blocks.

An order of arrangement of work blocks arranged on the editing region 120 corresponds to an order of execution of work blocks in a process flow. In the exemplary embodiment, an order of execution of work blocks on the editing region 120 is set from top to bottom and left to right. On the editing region 120, higher work blocks will be executed earlier than lower work blocks. On the editing region 120, more left work blocks will be executed earlier than more right work blocks.

On the editing region 120, an image guiding a position onto which a work block (more specifically, an object indicative of a work block) can be added and arranged is displayed. This image is a guide 121 in FIG. 4 and a guide 122 in FIG. 5.

In FIG. 4, no work block is arranged on the editing region 120. That is, work blocks can be added and arranged onto the editing region 120. When work blocks can be added and arranged onto the editing region 120, the controller 10 causes the display unit 31 to display the guide 121 on the editing region 120. The guide 121 includes text 121a guiding a drag and drop operation to a user since no object is arranged on the editing region 120. In the state in FIG. 4, a work block to be executed first is to be dragged and dropped. The guide 121 is thus arranged on an uppermost section of the editing region 120. However, the guide 121 may be placed at a desired position. To satisfy creating of a process flow including many work blocks, the editing region 120 may be able to scroll in a vertical direction and/or a horizontal direction.

In FIG. 5, the editing region 120 is arranged with the object 201. The work block represented by the object 201 and displayed in the work block display section 111 includes a process configured to perform outputting for guiding a work procedure to an operator who uses the device (e.g., work terminal 5) configured to execute a process flow. Since one work block can be executed after the work block in here, the editing region 120 displays the guide 122 indicative of a position onto which an object can be added. The guide 122 lies below the object 201, indicating that a work block (hereinafter referred to as next work block) to be executed after the object 201 can be arranged.

The work block displayed in the work block display section 112 includes a process configured to read a 2D code. The process acquires read data read from an image code by a device configured to optically read the image code, such as the camera 57 of the work terminal 5. The work block is to be set with two next work blocks. In other words, a case when a 2D code is read successfully is specified as a positive determination, while a case when reading is failed or no reading takes place is specified as a negative determination, and next work blocks respectively corresponding to the positive determination and the negative determination are to be set.

The work block displayed in the work block display section 113 includes a process configured to enter text. The process acquires data of text entered by an operator with the input device 56 of the work terminal 5. A method used in the process to detect and acquire an entry by an operator is not limited to a method using the input device 56. For example, a text recognition process using imaging data of the camera 57 and a sound recognition process for sound collected with the microphone 60 may be used to detect various entries including text. A bar-code reader may be used as the external device 68 to read a bar-code and to acquire read data. The acquired data may then be detected as an entry by an operator. A motion acquired from a detection value of the motion sensor 62 may be detected as an entry by an operator. The input detection methods are applicable to work blocks displayed in the work block display sections 114, 115, and 116, described later.

The work block displayed in the work block display section 113 is to be set with two next work blocks respectively corresponding to a positive determination and a negative determination. The positive determination corresponds to a case when text is entered, while the negative determination corresponds to a case when no text is entered.

The work block displayed in the work block display section 114 includes a process configured to make a positive/negative determination. In the process, an entry by an operator specifying positive or negative is to be detected. The work block is to be set with two next work blocks respectively corresponding to a positive determination and a negative determination. The positive determination corresponds to an entry representing positive, while the negative determination corresponds to an entry representing negative.

The work block displayed in the work block display section 115 includes a process configured to make a selection in a check box. The work block displayed in the work block display section 116 includes a process configured to make an entry in a radio button. The processes respectively display a check box and a radio button to allow an operator to view the check box and the radio button, and to detect selections made by the operator in the check box or the radio button. The work blocks displayed in the work block display sections 115 and 116 are each set with next work blocks in accordance with the number of check boxes or radio buttons.

The work block displayed in the work block display section 117 represents an end of the process flow. No next work block can be set to the work block.

The guide 121 is an image indicative of a position onto which a work block can be arranged on the editing region 120, and is displayed to guide, to a user, a position onto which a work block can be added. The guide 121 is advantageously an image that can be distinguished from a work block to be arranged in accordance with an operation by a user, and is displayed with a broken line, for example, as illustrated in FIG. 4.

In FIG. 5, the guide 122 displayed in response to the object 201 is displayed, in number, in line with work blocks that can be set as next steps (hereinafter also referred to as next processes or next flows) for an object of the object 201. The object 201 represents the work block displayed in the work block display section 111. One next work block can be added after the work block. The guide 122 is displayed to indicate that an object of the next step can be arranged below the object 201.

As described above, work blocks that can be incorporated into a process flow each have various attributes, such as the number of next work blocks. The PC 1 governs the attributes by the condition definition information 24.

FIG. 6 is a schematic view of the condition definition information 24. For description purposes, FIG. 6 illustrates, in a table, a configuration example of the condition definition information 24. However, a data format and a data arrangement configuration of the condition definition information 24 may be selected as desired.

In the example in FIG. 6, a setting content, the number of next work blocks, and an image of an object to be displayed on the editing region 120 are associated with each other per work block, and are set in the condition definition information 24. An image of an object itself may not be included in the condition definition information 24. Data of the image of the object may be included in the display-related data 23, for example. In this case, the condition definition information 24 may include at least information specifying data of an image of an object included in the display-related data 23, the information being associated per work block.

The number of next work blocks can be referred to as the number of objects to be coupled on the editing region 120. In this point of view, the number of next work blocks can be referred to as the number of objects to be coupled or the number of coupling points possessed by each object. In FIG. 6, the number of next work blocks is described as the number of coupling points. A coupling point denotes a position to which a next object is to be coupled.

Work blocks of objects arranged on the editing region 120 are specified beforehand with items to be set. The items are referred to as setting contents in FIG. 6. For example, a work block specifying a work procedure (corresponding to the work block display section 111 in FIG. 4) is to be set with a work name, a work ID, a content to be output to an operator as the work procedure (e.g., image and/or text), and other work related settings. If the items have not yet been set, the work terminal 5 cannot execute the work block. Setting items in the condition definition information 24 are conditions allowing a work block to be executed.

Similarly, a setting content for a work block in which a 2D code is to be read includes read data and information about an association between a result of determination and coupling points. Read data refers to data to be entered as data of a read 2D code, i.e., information specifying data expected to be entered, such as, the number of digits in read data and a data format (e.g., numerical value, text, mathematical formula, and URL). An association between a result of determination and coupling points represents information about an association among two coupling points (bottom and right) on the editing region 120, a case when a 2D code is read successfully (positive determination), and a case when reading is failed (negative determination). Entering the information satisfies a condition of executing the work block in which a 2D code is to be read.

Similarly, a setting content for a work block in which text is to be entered includes information about an association among a limited number of characters in text to be entered, a result of determination, and coupling points. An association between a result of determination and coupling points represents information about an association among two coupling points (bottom and right) on the editing region 120, a positive determination, and a negative determination. Entering the information satisfies a condition of executing the work block in which text is to be entered.

A setting content for a work block in which a positive/negative determination is to be made includes information about an association between a result of determination and coupling points.

A setting content for a work block in which a selection of check box or a selection of radio button is to be made includes the number of check boxes or the number of radio buttons and text to be displayed and output in response to the check boxes or radio buttons.

A work block used as end of flow includes no setting item.

As described above, in the condition definition information 24, for a work block that can be included in a process flow to be created or edited with the process flow definition tool 22, a condition allowing the work block to be executed and an image (object) to be displayed on the editing region 120 are associated with each other. In creating and editing a process flow with the editing screen 101, the condition definition information 24 is referred to, and various processes are performed based on the condition definition information 24.

Now back to FIG. 3, the controller 10 displays the editing screen 101 (step S12), and executes a process flow editing process configured to create or edit a process flow in accordance with an operation by a user (step S13). The process flow editing process will be described later in detail.

The controller 10 stores the process flow data 25 representing the process flow created or edited in the process flow editing process in the storage unit 20 (step S14). When an identical process flow is already stored in the process flow data 25, the process flow data 25 is overwritten and updated.

The controller 10 determines whether the process flow data 25 is to be output to an external device attached to the work terminal 5 and the like (step S15). When outputting of the process flow data 25 is instructed with an operation by the input device 34, and the like (step S15; YES), the controller 10 refers to the output setting data 26, and acquires settings corresponding to a type and a function of an output-destination device (step S16). The output setting data 26 may include a setting of one general-purpose type. In this case, the controller 10 may acquire a setting of one type, which is included in the output setting data 26.

The controller 10 follows the setting acquired in step S16 to generate and output the output data 27 based on the process flow data 25 (step S17). In step S17, the controller 10 may store the output data 27 in the storage unit 20, may output the output data 27 to a device coupled to the I/F unit 36, or may send the output data 27 to the communication unit 37. When the process flow data 25 is not to be output (step S15; NO), the controller 10 ends the process.

Figure 7:
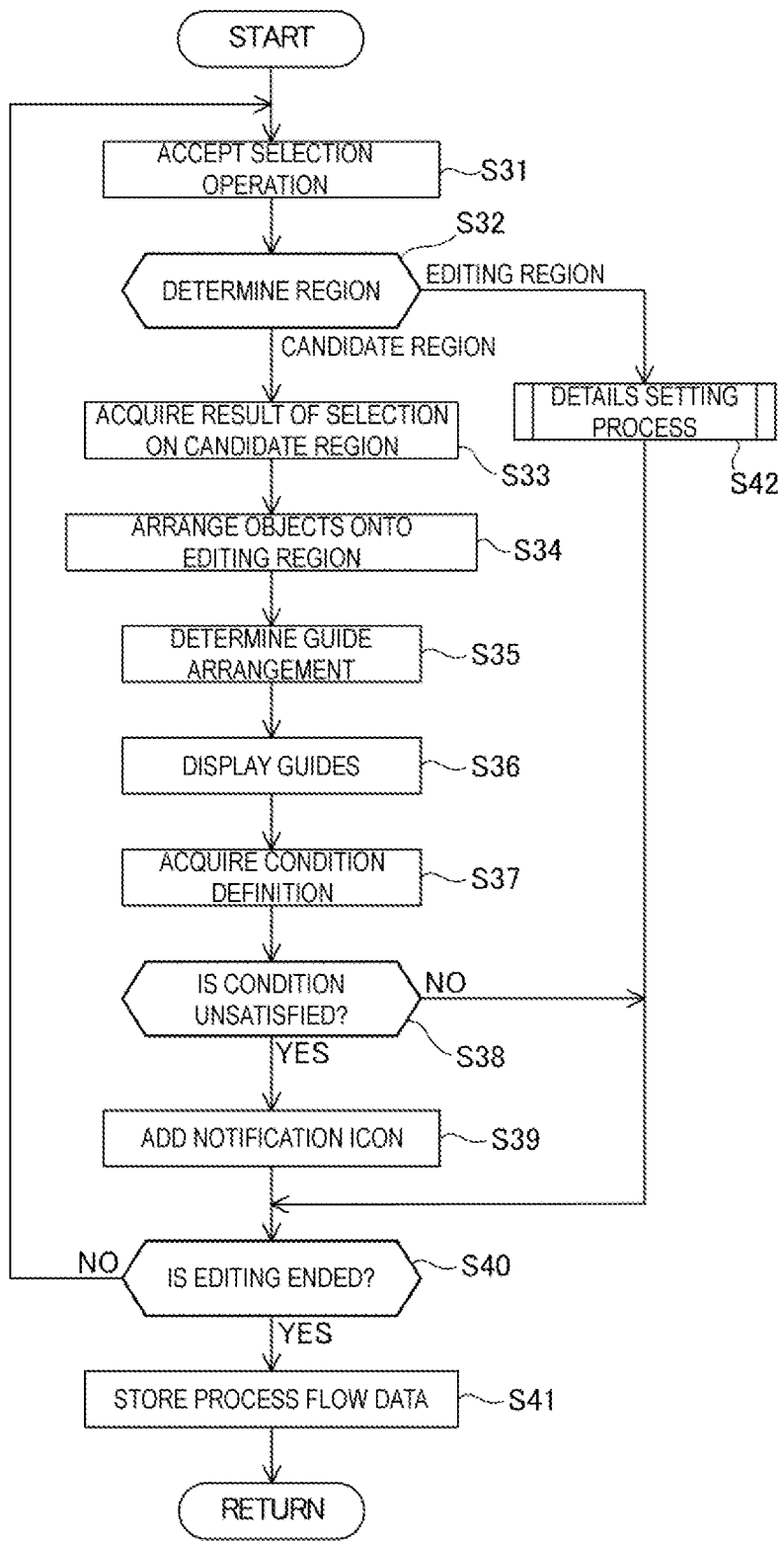
FIG. 7 is a flowchart illustrating an operation of the PC.

FIG. 7 is a flowchart illustrating an operation of the PC 1, and illustrates the process flow editing process described in step S13 in FIG. 3.

While the editing screen 101 is being displayed, the controller 10 accepts selection operations made onto the candidate region 110 or the editing region 120 (step S31). The controller 10 determines whether the accepted selection operations correspond to operations made on the candidate region 110 or operations made on the editing region 120 (step S32).

When the operations made on the candidate region 110 are accepted (step S32; candidates region), the controller 10 acquires a result of the selections (step S33). The result of the selection operations indicates the work blocks selected from among the work block display sections 111 to 117.

Figure 8:
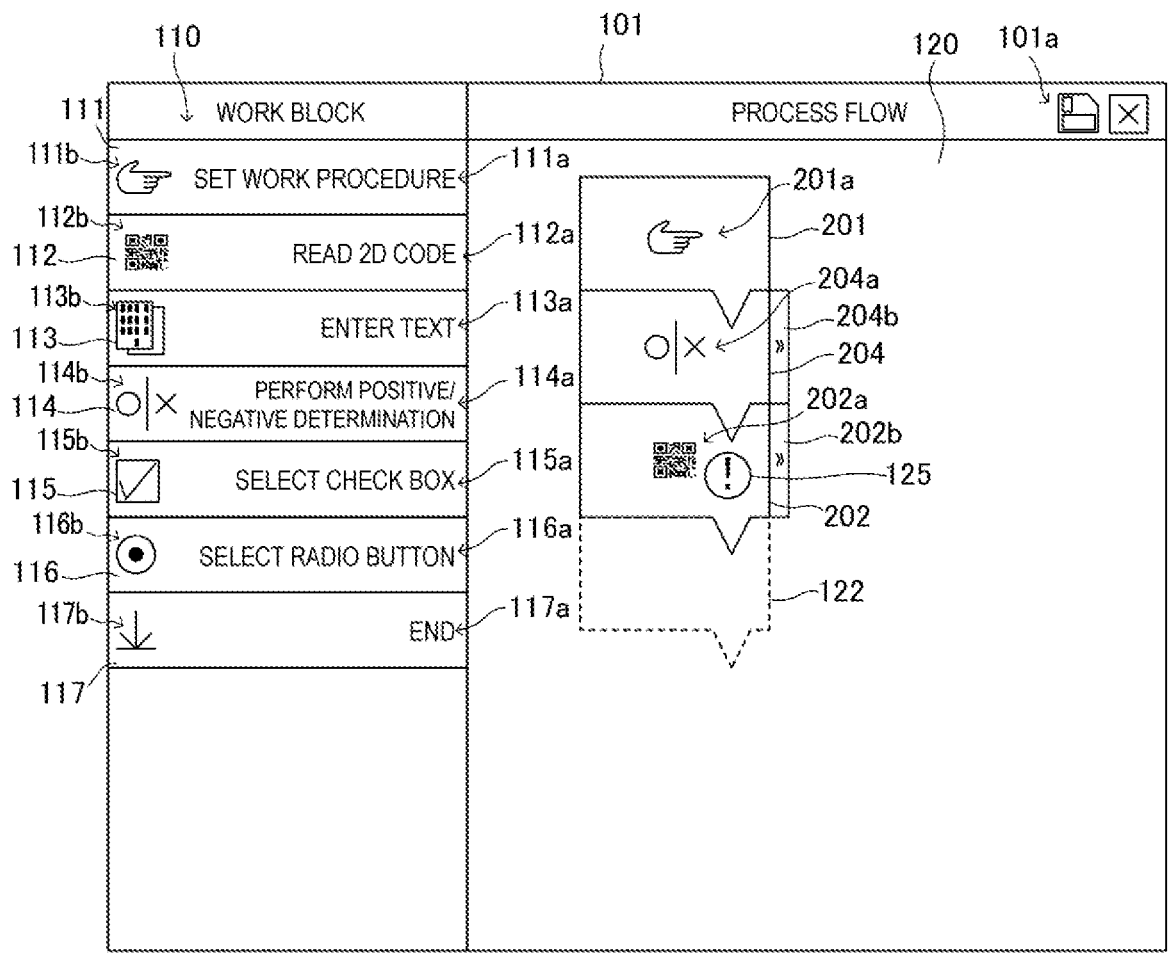
FIG. 8 is a view illustrating a display example of the PC.

The controller 10 adds and arranges, onto the editing region 120, objects corresponding to the work blocks selected on the candidate region 110 (step S34). The controller 10 determines, in accordance with the number of coupling points in the condition definition information 24, the number of the guides 122 to be displayed and display positions for the objects arranged in step S34 (step S35). In the exemplary embodiment, since an order of execution is specified from top to bottom and left to right on the editing region 120, as an example, the guide 122 is arranged below when the number of coupling points is one, while the guide 122 is arranged below and another guide is arranged on right when the number of coupling points is two. Such guides arranged on right of objects are branch guides 202*b* and 204*b*, described later, for example (FIG. 8). The controller 10 displays guides accompanied to objects in accordance with the arrangement determined in step S35 (step S36).

Next, the controller 10 acquires, from the condition definition information 24, setting contents relating to all the objects arranged on the editing region 120 or the objects added and arranged in step S34 (step S37). The controller 10 determines whether all the objects arranged on the editing region 120 or the objects added and arranged in step S34 satisfy conditions stored in the condition definition information 24 (step S38). Satisfying a condition denotes that all setting contents in the condition definition information 24 are set already, the condition other than that is determined as unsatisfied.

When an object is determined not to satisfy a condition (unsatisfied) (step S38; YES), the controller 10 adds and displays a notification icon on the object determined as unsatisfied (step S39). When the object in question is already displayed with the notification icon, the notification icon is kept displayed.

FIG. 8 is a view illustrating a display example of the PC 1, and illustrates a configuration example of the editing screen 101. FIG. 8 illustrates a state when a plurality of objects are arranged on the editing region 120.

In the state in FIG. 8, the editing region 120 of the editing screen 101 is arranged with the object 201, as well as with objects 204 and 202 in a descending order. The guide 122 is displayed below the object 202.

The object 204 and the object 202 respectively have two coupling points. The branch guide 204*b* is displayed on right of the object 204, indicating that another next object can be arranged than an object that can be arranged below. Similarly, the object 202 is displayed with the branch guide 202*b*. Similar to the guide 122, the branch guides 202*b* and 204*b* each guide that an object corresponding to a work block can be added and arranged. An object having a plurality of coupling points causes a process flow to branch. An object corresponding to a work block having a plurality of coupling points can be referred to as a branch object. In the exemplary embodiment, for convenience, a process flow mainly including a series of objects extending downward from a branch object is created. On the other hand, a flow including other objects extending another direction than downward (e.g., right) from a branch object is referred to as a branch flow.

In FIG. 8, a notification icon 125 is further displayed in an overlapped manner on the object 202. The notification icon 125 indicates that the object 202 is not set with a content specified in the condition definition information 24, i.e., the object 202 is in an unsatisfied state. The notification icon 125 is a display indicating that a condition is not satisfied. The notification icon 125 is an image notifying, to a user of the PC 1, that the object 202 asks for a setting, and guiding an urge to provide the setting.

In FIG. 8, the notification icon 125 is displayed on the object 202, the guide 122 is displayed below the object 202, and the branch guide 202*b* is displayed on right. Objects can be added and arranged below and right of the object 202. As described above, even when an object (a work block corresponding to an object) that does not satisfy a condition specified in the condition definition information 24 is present, the controller 10 can edit a process flow relating to another object. Thus, a user can create or edit a process flow in a desired procedure. For example, the user can first arrange objects in a process flow, and then solve unsatisfied states. Without being forced to use a certain work procedure, a user can create and edit a process flow in an improved and efficient manner.

Now back to FIG. 7, after a notification icon is added on an object determined as unsatisfied (step S39), the controller 10 determines whether the process flow is to be edited or ended (step S40). In step S40, a determination is made in accordance with whether an operation to the instruction section 101*a* has been made, for example. When absence of an object determined as unsatisfied is determined (step S38; NO), the controller 10 causes the notification icons being already displayed to disappear, and performs step S40.

To end editing of the process flow (step S40; YES), the controller 10 creates the process flow data 25 in accordance with states of objects arranged on the editing region 120, and causes the storage unit 20 to store the process flow data 25 or updates the process flow data 25 (step S41).

To continue editing of the process flow (step S40; NO), the controller 10 returns to step S31.

When entries of selections accepted in step S31 are entries onto the editing region 120 (step S32; editing region), the controller 10 executes a details setting process (step S42). The details setting process is a process configured to set setting contents defined in the condition definition information 24 with respect to objects arranged already on the editing region 120. After the details setting process is executed (step S42), the controller 10 performs step S40.

Figure 9:
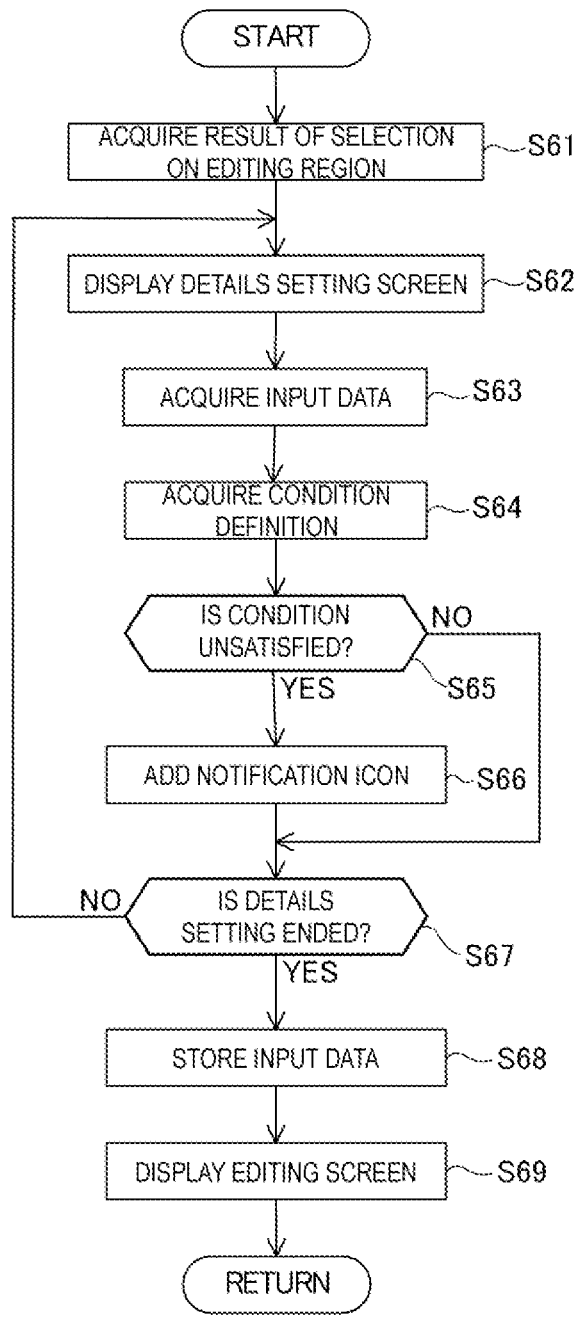
FIG. 9 is a flowchart illustrating an operation of the PC.

FIG. 9 is a flowchart illustrating an operation of the PC 1, and illustrates the details setting process described in step S42 in FIG. 7. The details setting process corresponds to a process configured to add information or an attribute to an object.

The controller 10 acquires a result of the selection operations accepted in step S31 in FIG. 7 (step S61). The result acquired in step S61 indicates the operations of selecting any of the objects arranged on the editing region 120.

The controller 10 causes the display unit 31 to switch from the editing screen, and to display a details setting screen (step S62).

Figure 10:
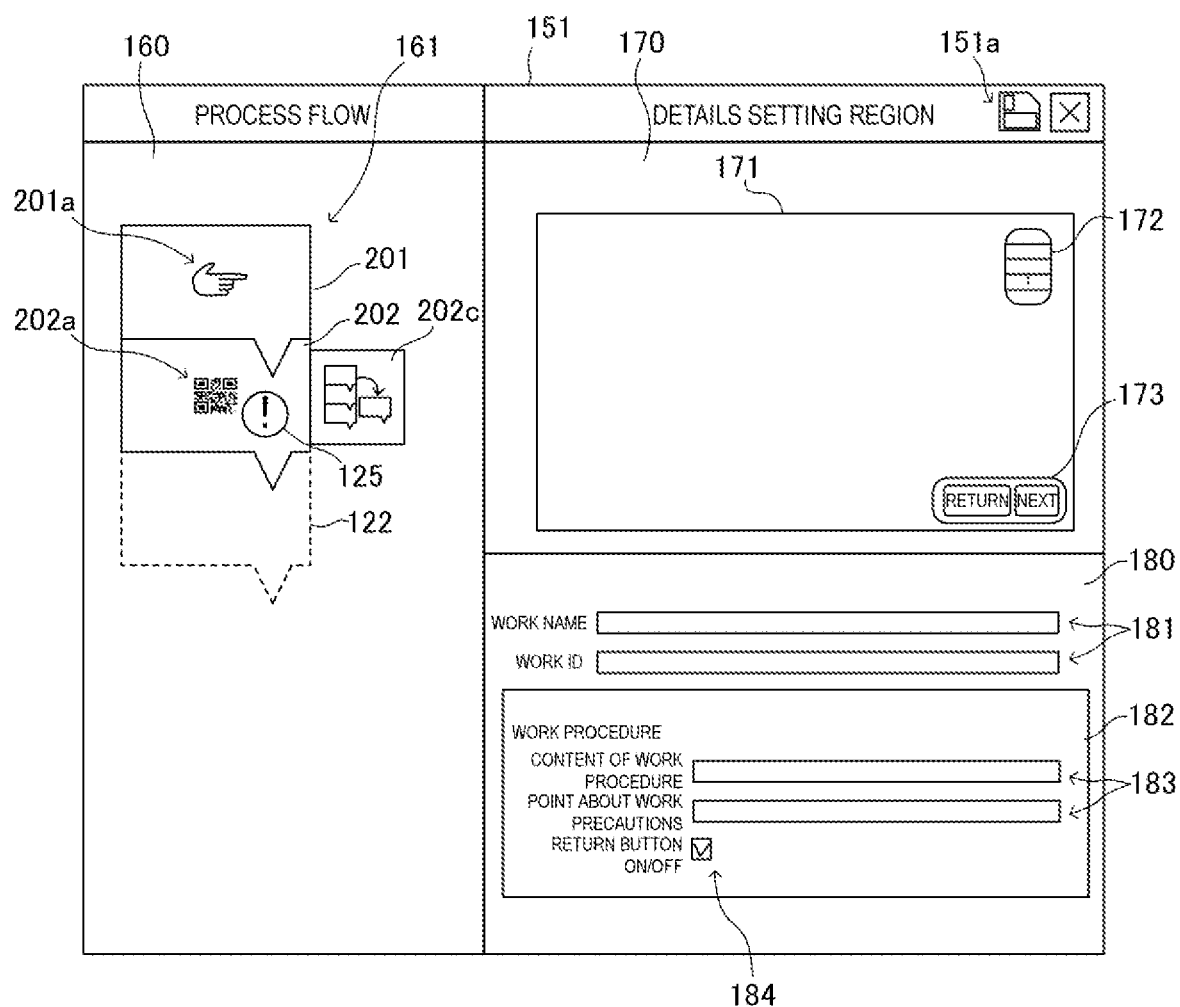
FIG. 10 is a view illustrating a display example of the PC.

FIG. 10 is a view illustrating a display example of the PC 1, and illustrates a configuration example of a details setting screen 151. FIG. 10 illustrates an example of the details setting screen 151 being switched and displayed, with a plurality of objects arranged on the editing region 120 of the editing screen 101.

The details setting screen 151 includes a process flow display region 160, a view editing region 170, and a details setting region 180 (information input region). At an upper section of the details setting screen 151, an instruction section 151a is arranged. The instruction section 151a includes an icon instructing storing of details settings, as well as includes an icon instructing ending of the details setting process.

The process flow display region 160 is a region onto which a process flow 161 is displayed, as well as objects indicative of work blocks configuring the process flow 161 are arranged in an order of execution. In the example in FIG. 10, the process flow 161 including the object 201 and the object 202 is displayed. The process flow 161 does not include an object 207 indicative of end of the flow since the flow is still under creation. Thereby, the guide 122 is displayed at a bottom of the process flow 161.

The object 202 is a branch object allowing another object to be arranged on right. In the process flow display region 160, a destination specifying section 202c is arranged on right of the object 202. The destination specifying section 202c is an image indicative of a destination object when the flow branches rightward from the object 202. As a destination to be set at a coupling point on the right of the object 202, a new object can be set, as well as an object already included in the process flow 161 can be specified. For example, a setting can be made so that, when a positive determination or a negative determination is made at the object 202 in the process flow 161, a flow traces back an order of execution to the object 201 lying above. At the coupling point, the destination specifying section 202c indicates that one of the objects already included in the process flow 161 is specified as a destination. A destination represented by the destination specifying section 202c may be placed before or after the object 202 in the order of execution.

The view editing region 170 is a region used to display a configuration (user view 171) of a screen displayed by the work terminal 5 when the work terminal 5 executes the process flow 161 created in the process. The view editing region 170 displays the configuration of the screen in accordance with any of objects configuring the process flow 161 displayed on the process flow display region 160. For example, when a result of the selections, which is acquired in step S61 (FIG. 9), indicates the object 201 on the editing region 120 in the editing screen 101 (FIG. 5), the user view 171 in FIG. 10 is displayed.

In the example in FIG. 10, the user view 171 illustrates a configuration of a screen corresponding to the object 201 that is the first object (work block) in the process flow 161. The user view 171 includes a process display section 172 displaying an order of a plurality of work blocks included in the process flow 161. The process display section 172 is a display section notifying, to an operator, a position of a work block being executed in a whole process.

The user view 171 includes an operation guide display section 173. The operation guide display section 173 guides, to an operator, an association between an operation of the input device 56 and progress of the process flow 161. The operator can operate the input device 56 in accordance with the operation guide display section 173 being displayed to advance the process flow 161 to a next work block, or to return to a previous work block in an order of execution.

For example, when the work terminal 5 is used to display an image and/or text while the process flow 161 is being executed, the user view 171 can be used to set a display position, a display size, and a display timing and the like for the image and/or the text.

The details setting region 180 is a region used to enter setting contents defined in the condition definition information 24 for an object selected in the process flow 161. In the details setting region 180 in FIG. 10, a title setting section 181 and a work information setting section 182 are arranged for accepting entries in accordance with setting contents for the object 201. The title setting section 181 includes entry boxes used to enter a work name and a work ID. The work information setting section 182 includes entry boxes 183 used to enter contents to be displayed to an operator as a work procedure, as well as includes a check box 184 and the like. Upon the setting contents are appropriately entered into the details setting region 180, the object 201 satisfies a condition.

Now back to FIG. 9, after the controller 10 displays the details setting screen 151 (step S62), the controller 10 acquires data entered into the details setting region 180 (step S63). The controller 10 acquires the setting contents from the condition definition information 24 for the object in question on the details setting region 180 (step S64). The controller 10 determines whether the object in question on the details setting region 180 satisfies the condition stored in the condition definition information 24 (step S65).

When the controller 10 determines that the condition has not yet been satisfied (unsatisfied) (step S65; YES), the controller 10 adds and displays a notification icon on the object in question on the process flow display region 160 (step S66). When a notification icon is already displayed, the notification icon is kept displayed.

Figure 11:
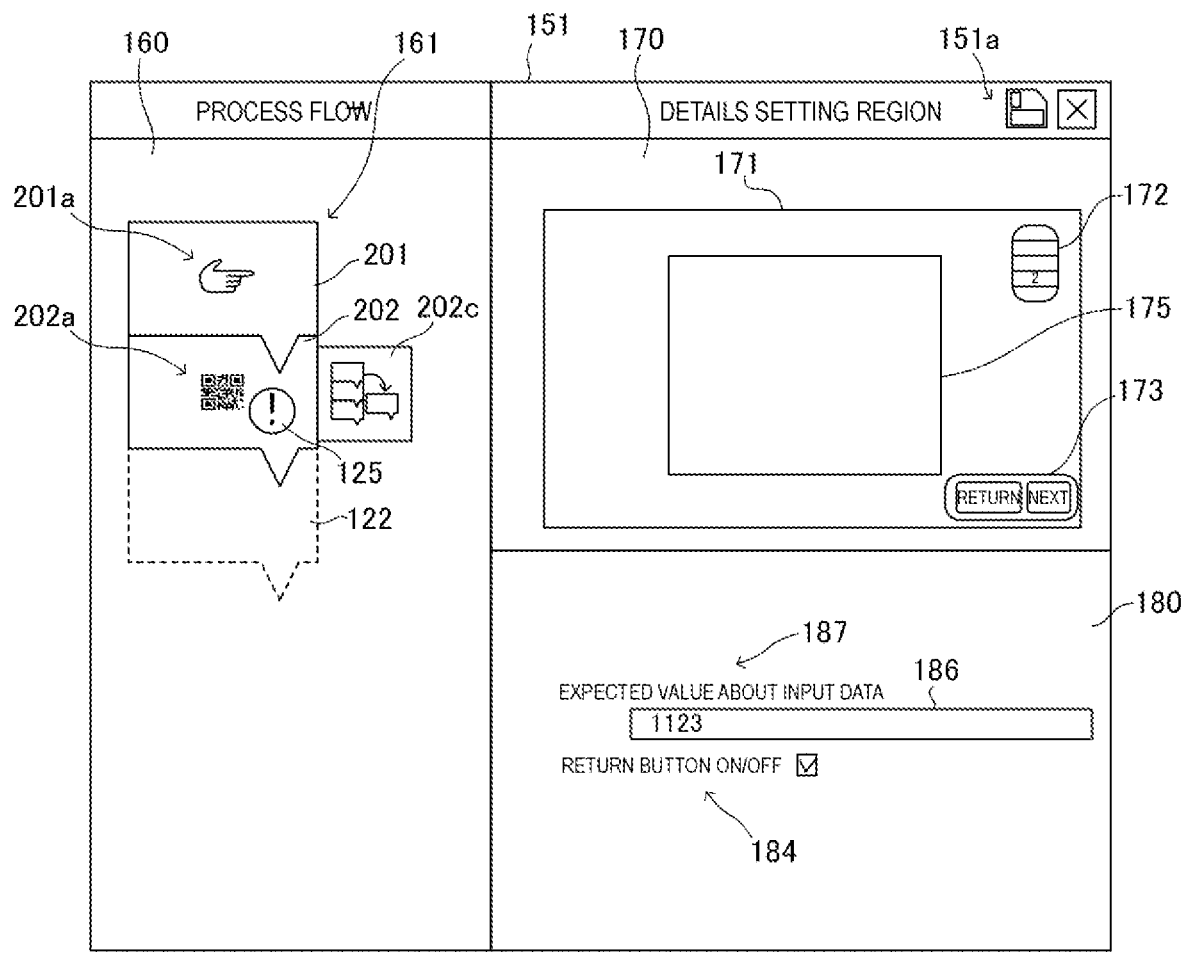
FIG. 11 is a view illustrating a display example of the PC.

FIG. 11 is a view illustrating a display example of the PC 1, and illustrates a configuration example of the details setting screen 151.

In the example in FIG. 11, a configuration of a screen corresponding to the object 202 that is the second object in the process flow 161 is displayed on the user view 171. Specifically, the user view 171 is arranged with a reading frame 175, in addition to the process display section 172 and the operation guide display section 173. The reading frame 175 guides a position of a 2D code when the 2D code is to be read with the camera 57.

When the work terminal 5 executes the work block associated with the object 202, the display 54 displays an image captured with the camera 57. The reading frame 175 guides, to an operator, a position of the work terminal 5 and a position of the 2D code for an adjustment so that the 2D code to be read falls within the reading frame 175.

In the details setting screen 151 in FIG. 11, the details setting region 180 is arranged with an entry box 186 used to enter information corresponding to the object 202. A numeral "187" represents a title of data entered into the entry box 186.

The condition definition information 24 (FIG. 6) includes conditions, such as a number of digits and a data format and the like of data expected to be entered, for a work block in which a 2D code is to be read. The entry box 186 is to be entered with an expected value of data of a 2D code to be read with respect to the object 202. The work terminal 5 can determine whether a 2D code has been read successfully based on whether data entered into the entry box 186 and data of the 2D code detected from an image captured by the camera 57 match each other. In the example in FIG. 11, a piece of data or a plurality of pieces of data may be entered into the entry box 186.

The controller 10 determines whether the object 202 satisfies the condition based on whether data conforming to the condition definition information 24 has been entered into the entry box 186. In the example in FIG. 11, a numerical value is entered into the entry box 186. When the condition has been defined in the condition definition information 24 so that an URL is to be entered as input data for a work block in which a 2D code is to be read, the value entered into the entry box 186 in FIG. 11 does not satisfy the condition. As a result, in the details setting region 180, a display aspect of the details setting region 180 has been changed so as to notify that data entered into the entry box 186 does not satisfy the condition.

Specifically, the title 187 is displayed in a bold font. A method of changing a display aspect is not limited to the method used in the example in FIG. 11. A method of changing a display color of the title 187 or a display color of data entered into the entry box 186 from a default display color to a desired display color may be adopted. A method of changing a background color of the title 187 and the entry box 186 from a default display color to a desired display color or a method of displaying the notification icon 125 at a position adjacent to the entry box 186 may be adopted. An error message may be displayed. When data entered into the entry box 186 is determined as unsatisfied, the process flow display region 160 displays the notification icon 125 on the object 202.

As described above, even while information about an object is entered or edited on the details setting screen 151, a fact that the object does not satisfy a condition can be notified.

As illustrated in FIG. 11, the controller 10 determines whether, after a notification icon is added on an object determined as unsatisfied (step S66), the details setting process is to be ended (step S67). In step S67, a determination is made in accordance with whether an operation is made on the instruction section 151a, for example. When an object is determined as not unsatisfied (satisfied) (step S65; NO), the controller 10 causes the notification icon being already displayed to disappear, and performs step S65.

When the details setting process is to be ended (step S67; YES), the controller 10 updates the process flow data 25 so as to include the data entered in the details setting process or causes the storage unit 20 or the RAM (not shown) to temporarily store the entered data (step S68). The controller 10 causes the display unit 31 to switch from the details setting screen 151 and to display the editing screen 101, and then returns to the process in FIG. 7.

When the details setting process is not to be ended (step S67; NO), the controller 10 returns to step S62.

In the exemplary embodiment, the details setting process in FIG. 9 is executed for each of the objects arranged on the editing region 120. Once the details setting process is executed for an object selected on the editing region 120, and then the details setting process is to be performed for another object, a process configured to once return to the editing screen 101 is performed. The configuration can be changed as desired. For example, objects configuring the process flow 161 displayed on the details setting screen 151 may be sequentially selected so that the details setting process can be sequentially executed.

Figure 12:
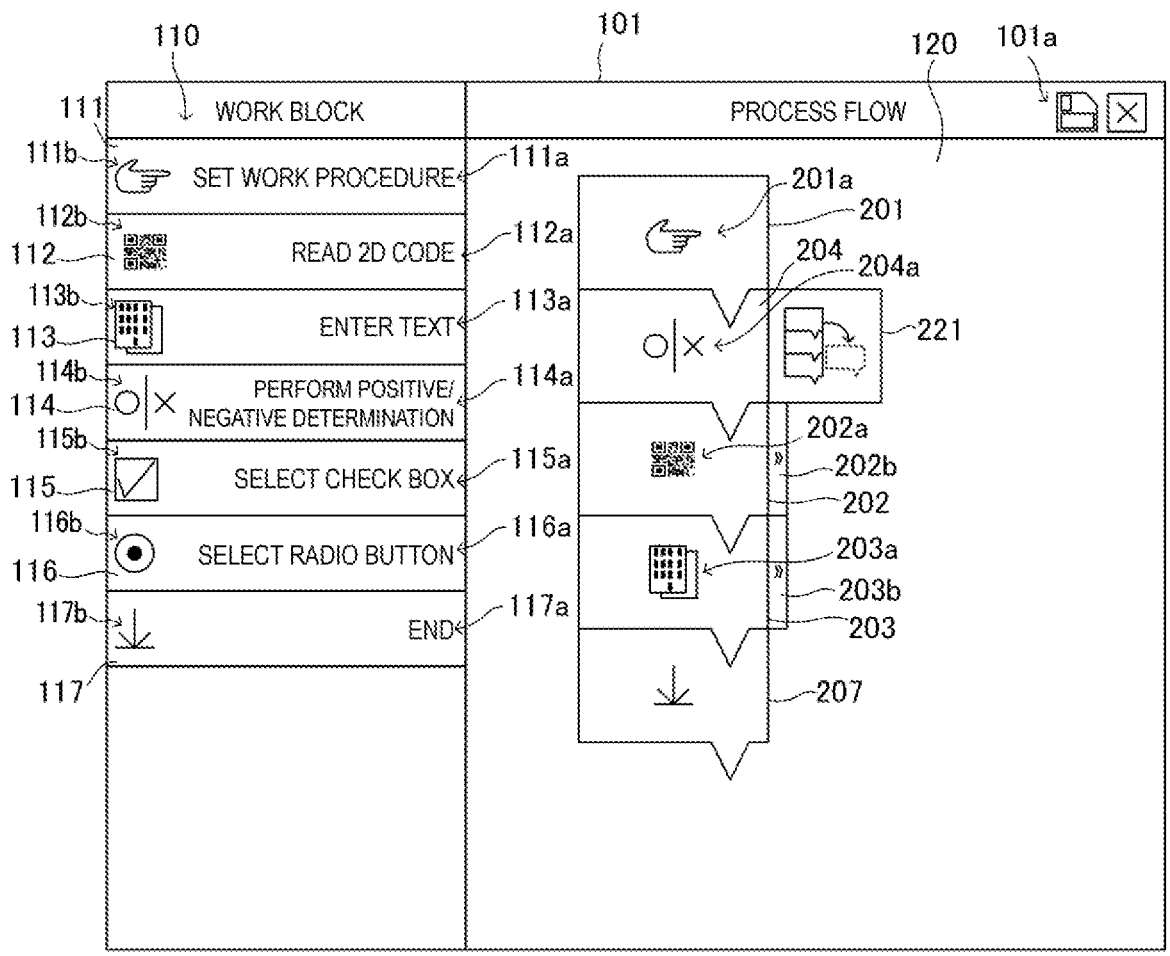
FIG. 12 is a view illustrating a display example of the PC.

FIG. 12 is a view illustrating a display example of the PC 1, and illustrates a configuration example of the editing screen 101. FIG. 12 illustrates a state when a process flow has been created on the editing region 120.

In the state in FIG. 12, the editing region 120 of the editing screen 101 is arranged with the objects 201, 204, 202, 203, and 207 in a descending order. The object 207 represents an end of a process flow, indicating that the process flow has been completed.

In the example in FIG. 12, the objects 204, 202, and 203 on the editing region 120 are branch objects. A branch flow icon 221 is displayed in line with a coupling point on right of the object 204. The branch flow icon 221 illustrates another flow as a destination that is branched from the coupling point on right and that corresponds to a negative determination. Upon the branch flow icon 221 is selected through an operation by a user, for example, a branch flow is displayed on the editing region 120. The object 202 and the object 203 are each set with the object 207 as a destination corresponding to a negative determination. In the example in FIG. 12, the branch guide 202b and a branch guide 203b are respectively displayed at the coupling points corresponding to the negative determinations to be made in the objects 202 and 203. However, branch flow icons may be added to and displayed for the objects 202 and 203.

Figure 13:
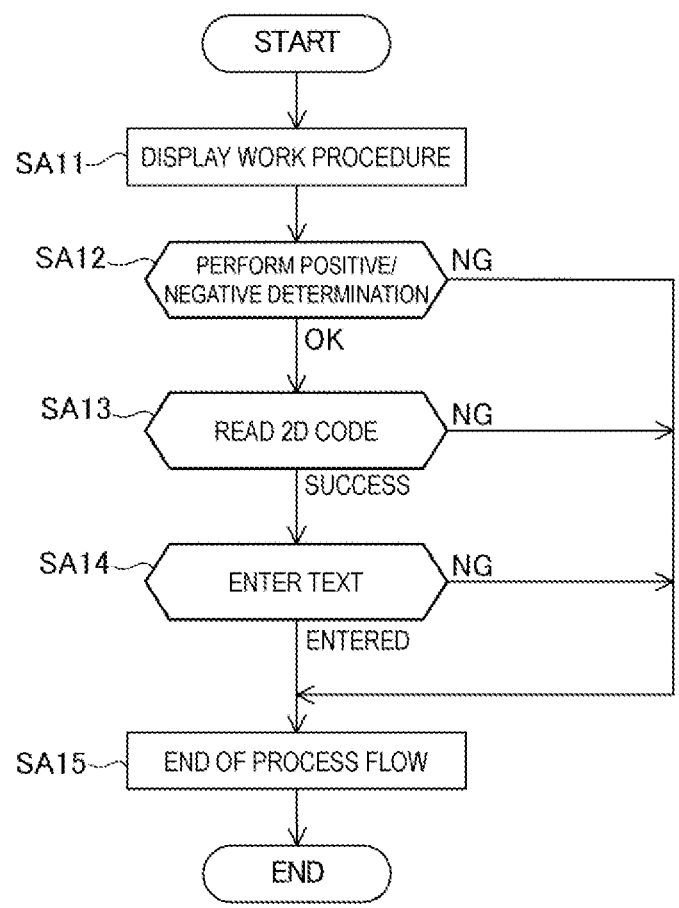
FIG. 13 is a flowchart illustrating an operation of the work terminal, based on a process flow.

FIG. 13 is a flowchart illustrating an operation of the work terminal 5 based on a process flow created with the PC 1, and illustrates an operation to be executed in accordance with the process flow data 52c by the work terminal 5. The operation in FIG. 13 corresponds to a process flow created on the editing region 120 in FIG. 12.

The controller 51 of the work terminal 5 causes the display unit 53 to display an image and/or text of a work procedure on the display 54 (step SA11). Step SA11 corresponds to the object 201. Upon the controller 51 detects an entry by an operator through the input unit 55 and the like, the controller 51 performs step SA12.

In step SA12, the controller 51 executes a positive/negative determination (step SA12). Step SA12 corresponds to the object 204. The controller 51 detects an entry of the operator for positive or negative. When positive is determined (step SA12; positive), the controller 51 makes a positive determination, and performs step SA13. In step SA13, the controller 51 reads a 2D code (step SA13). Step SA13 corresponds to the object 202. When, in step SA12, negative is determined (step SA12; negative), the controller 51 makes a negative determination, and performs step SA15, described later.

When, in step SA13, a 2D code that is expected to be read and that is set in line with the object 202 is read (step SA13; success), the controller 51 makes a positive determination, and performs step SA14. When the 2D code that is expected to be read is not read (step SA13; negative), the controller 51 makes a negative determination, and performs step SA15, described later.

In step SA14, the controller 51 accepts an entry of text (step SA14). Step SA14 corresponds to the object 203. When, in step SA14, text is entered within a maximum limit for a number of characters, which is set in line with the object 203 (step SA14; entered), the controller 51 makes a positive determination, and performs step SA15. When text has not yet been entered within the maximum limit for a number of characters (step SA14; negative), the controller 51 makes a negative determination, and performs step SA15.

In step SA15, the controller 51 ends the process flow.

The flowchart illustrated in FIG. 13 corresponds to the process flow edited on the editing screen 101, and reflects an order of execution of the objects, the branches, and the transitions along with the branches on the editing region 120. Steps of the flowchart in FIG. 13 respectively correspond to the work blocks respectively corresponding to the objects 201 to 207, and include setting contents set on the details setting screen 151.

As described above, a user who operates the PC 1 can cause the controller 10 to execute the process flow definition tool 22 in accordance with the display-related data 23 and the condition definition information 24 to easily create a process flow satisfying defined conditions.

The condition definition information 24 defining conditions relating to work blocks in a process flow can be edited through operations by a user.

Figure 14:
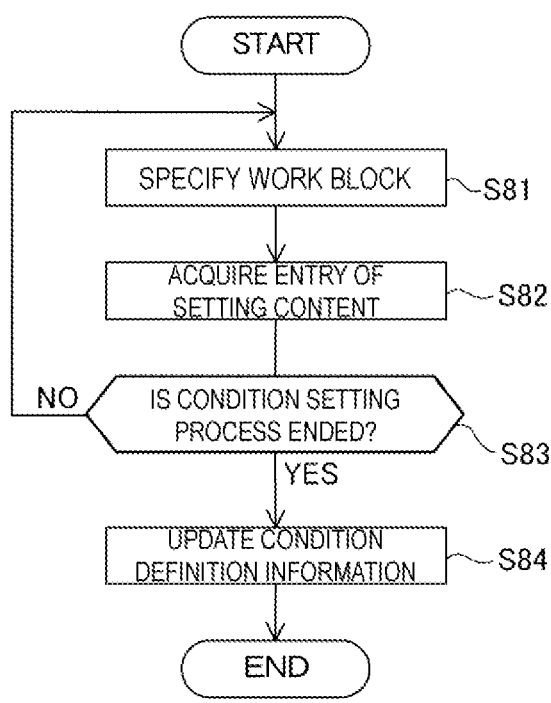
FIG. 14 is a flowchart illustrating an operation of the PC.

FIG. 14 is a flowchart illustrating an operation of the PC 1, and illustrates a condition setting process configured to create, edit, or update the condition definition information 24.

The process flow definition tool 22 may be an application program functioning as a condition setting process. In this case, the controller 10 is capable of executing the process flow definition tool 22 to execute the condition setting process in FIG. 14.

In accordance with an operation by a user, the controller 10 specifies a work block to be edited in the condition definition information 24 (step S81), and acquires a content entered by the user for a setting content for the specified work block (step S82).

The controller 10 determines whether the condition setting process is to be ended based on an operation by the user (step S83). When the condition setting process is not to be ended (step S82; NO), the controller 10 returns to step S81, where setting contents for other work blocks are to be entered and the like. When the condition setting process is to be ended (step S83), the controller 10 updates the condition definition information 24 based on the contents acquired in step S82 (step S84), and then ends the process.

As described above, the PC 1 according to the exemplary embodiment applied with the disclosure creates a process flow (operation flow) including a plurality of work blocks (operation steps). The process flow is specified with an order of execution of the plurality of work blocks. The PC 1 includes the input unit 33 configured to accept entries, the display unit 31 configured to cause the display 32 to perform displaying, and the controller 10. The controller 10 causes the display 32 to display the editing region 120 as the work region, and arranges objects indicative of work blocks onto the editing region 120 in accordance with entries accepted by the input unit 33. The controller 10 creates a process flow based on the arrangement of the objects on the editing region 120. The controller 10 compares the objects arranged on the editing region 120 with a condition set with respect to the work blocks corresponding to the objects, and determines at least either of acceptable and unacceptable. The controller 10 adds, when unacceptable is determined, a display indicative of condition unacceptability onto each of corresponding ones of the objects, and continues, after the display indicative of condition unacceptability is added onto each of the corresponding ones of the objects, arranging the objects onto the editing region 120 in accordance with the entries.

The program according to the disclosure corresponds to the process flow definition tool 22, and, when the controller 10 executes the process flow definition tool 22, achieves the information processing device and the information processing method according to the disclosure.

With the PC 1, while a user makes entries to arrange objects onto the editing region 120, if one of the objects being arranged is found unacceptable to the condition set with respect to the work blocks, the unacceptability can be notified with the display. By making entries to cause the display indicative of condition unacceptability to disappear, the user easily creates or edits a process flow satisfying the condition. Even when unacceptable is determined, the user can continue arranging objects. The user can make an entry to solve the unacceptability at a desired timing. Accordingly, convenience in creating or editing a process flow is improved.

The controller 10 creates the process flow that includes the work blocks respectively corresponding to the objects arranged on the editing region 120, and that is specified with the order of execution of the work blocks in accordance with an order of the arrangement of the objects. With the configuration, the user makes entries, arranges objects onto the editing region 120, and creates a process flow corresponding to an order of the arrangement of the objects. By arranging objects, the user easily creates or edits a process flow.

The controller 10 adds information or an attribute for the objects arranged on the editing region 120 in accordance with entries. When one of the objects arranged on the editing region 120 is not added with the information or the attribute of a set type, the controller 10 determines the one of the objects as condition unacceptable. With the configuration, when condition unacceptable is determined for a process of adding information or an attribute for objects, the user can be notified with the unacceptability. Accordingly, the user is supported for the process of adding information or an attribute for objects. Therefore, the user easily creates or edits an appropriate process flow.

A work block to be processed with the PC 1 is a process configured to perform at least one of outputting of information, entering of information, and making a determination each executed by a computer (e.g., work terminal 5). The controller 10 causes icons, which are indicative of processing of the work blocks corresponding to the object, to be associated with the objects arranged on the editing region 120, and to be displayed. By displaying icons on the objects on the editing region 120, a user can easily recognize computer processing represented by the work blocks. The user can thus easily create or edit a process flow.

The controller 10 causes the display 32 to display the details setting region 180 (FIG. 11) configured to accept entries of information about work blocks. When the controller 10 determines a work block corresponding to one of the objects arranged on the editing region 120 as condition unacceptable, the controller 10 causes the details setting region 180 to perform at least either of providing the display indicative of condition unacceptability and changing a display aspect. While the details setting region 180 is displayed, when an object is determined as condition unacceptable, the details setting region 180 can provide the display to notify the condition unacceptability. The user can easily recognize acceptability of a work block based on the display. The user can further take appropriate actions, such as making a re-entry to solve the condition unacceptability.

A work block to be processed with the PC 1 is a process configured to perform at least one of outputting of information, entering of information, and making a determination each executed by a computer (e.g., work terminal 5). The controller 10 causes icons, which are indicative of processing of the work blocks corresponding to the object, to be associated with the objects arranged on the editing region 120, and to be displayed. The controller 10 compares the objects arranged on the editing region 120 with a condition set in association with a process represented by a work block corresponding to an object, and determines at least either of acceptable and unacceptable. With the configuration, icons are displayed on the objects on the editing region 120. When one of the objects is determined as condition unacceptable, a display indicative of unacceptability is provided. The user thus easily recognizes a process represented by a work block and its acceptability based on the display. By taking into account contents of work blocks and a condition set for the work blocks, the user creates or edits an appropriate process flow.

The controller 10 outputs the output data 27 representing process flow data used to execute, by the computer (e.g., work terminal 5), a process flow created based on the arrangement of the objects on the editing region 120. The controller 10 adds information about the objects each added with the display indicative of condition unacceptability to the output data 27, and outputs the output data 27 as data described in a format specified beforehand. In accordance with the objects arranged on the editing region 120, a process flow to be executed by the computer can be easily created, and information indicative of condition unacceptability can be added to data of the process flow. The created process flow can be processed and output as data by another computer. The data allows the computer to detect condition unacceptability.

The controller 10 executes, in accordance with an entry accepted by the input unit 33, a condition setting process configured to set a condition relating to the work blocks (e.g., FIG. 14). The controller 10 compares the work blocks corresponding to the objects arranged on the editing region 120 in accordance with the condition set in the condition setting process, and determines at least either of acceptable and unacceptable. After a condition is set for a work block, and when the set condition is not satisfied, the display indicative of unacceptability is provided. Thus, a user sets a detailed condition relating to a process flow, as well as easily creates or edits the process flow satisfying the set condition.

The PC 1 includes the storage unit 20, and the controller 10 causes the storage unit 20 to store the condition definition information indicative of the condition set in the condition setting process. Once a condition is set based on the condition definition information, the condition can be used consecutively in creating or editing a process flow.

The disclosure is not limited to the exemplary embodiment configured as described above. The disclosure can be implemented in various aspects, as long as the aspects fall within the scope of the disclosure.

For example, in the above described exemplary embodiment, the PC 1 has been described as an information processing device configured to create a process flow as an operation flow. However, specific aspects of information processing devices may be selected as desired. For example, a server device communicably coupled with a plurality of the work terminals 5 may be used as an information processing device.

In the above described exemplary embodiment, the configuration has been exemplified, in which the PC 1 switches and displays the editing screen 101 and the details setting screen 151 arranged with a plurality of display regions, for example. However, the screens may be configured to be displayed simultaneously.

In the above described exemplary embodiment, the configuration has been described as an example, in which the controller 10 included in the PC 1 executes the process flow definition tool 22 representing a program stored in the storage unit 20 included in the PC 1. The disclosure is not limited to the configuration. For example, such a configuration may be adopted that a program to be executed by the controller 10 is stored in an external device attached to the PC 1, and the controller 10 acquires and executes the program via the I/F unit 36 or the communication unit 37. Similarly, in the work terminal 5, the process flow data 52c may be acquired via the I/F unit 63, the communication unit 64, or the wireless communication I/F unit 65, and may be executed by the controller 51.

Such a configuration may be adopted that at least some of the function blocks illustrated in FIGS. 1 and 2 are achieved with hardware, or achieved together with hardware and software. For example, devices applied with the disclosure are not limited to have either or both of the configurations in which separate hardware resources are arranged as illustrated in FIGS. 1 and 2.

Other detailed configurations may obviously be modified as desired.

The present application is based on and claims priority from JP Application Serial Number 2017-175145, filed Sep. 12, 2017, the disclosure of which is hereby incorporated by reference herein in its entirety.

What is claimed is:

1. An information processing device configured to create an operation flow including a plurality of operation steps, the operation flow being specified with an order of execution of the plurality of operation steps, the information processing device comprising:
an input unit configured to accept entries;
a display unit configured to cause a display face to perform displaying; and
a controller configured to
cause the display face to display a work region,
arrange objects indicative of the plurality of operation steps onto the work region in accordance with the entries accepted by the input unit, and
create the operation flow based on the arrangement of the objects on the work region,
wherein the controller
determines whether acceptable or unacceptable by comparison of the objects arranged on the work region with a condition set with respect to the plurality of operation steps respectively corresponding to the objects,
adds, when unacceptable is determined, a display indicative of condition unacceptability onto each of corresponding ones of the objects, and continues, after adding the display indicative of condition unacceptability onto each of the corresponding ones of the objects, arranging the objects onto the work region in accordance with the entries.

2. The information processing device according to claim 1, wherein the controller creates the operation flow including the plurality of operation steps respectively corresponding to the objects arranged on the work region, the operation flow being specified with the order of execution of the plurality of operation steps, in accordance with an order of the arrangement of the objects.

3. The information processing device according to claim 1, wherein the controller
executes a processing to add information or an attribute for the objects arranged on the work region in accordance with entries, and
determines, when one of the objects arranged on the work region is not added with the information or the attribute of a set type, the one of the objects as condition unacceptable.

4. The information processing device according to claim 3,
wherein one of the plurality of operation steps is at least one of processing of outputting of information, of entering of information, and of making a determination executed by a computer, and
wherein the controller causes icons, the icons being indicative of processing of the plurality of the operation steps respectively corresponding to the objects, to be associated with the objects arranged on the work region, and to be displayed.

5. The information processing device according to claim 1,
wherein one of the plurality of operation steps is at least one of processing of outputting of information, of entering of information, and of making a determination executed by a computer,
wherein the controller
causes icons, the icons being indicative of processing of the plurality of operation steps respectively corresponding to the objects, to be associated with the objects arranged on the work region, and to be displayed, and
by comparison of the objects arranged on the work region with the condition set in association with processing of the plurality of operation steps respectively corresponding to the objects, determines whether acceptable or unacceptable.

6. The information processing device according to claim 1, wherein the controller
causes the display face to display an information input region configured to accept entries of information about the plurality of operation steps, and
causes, when one of the plurality of operation steps respectively corresponding to the objects arranged on the work region is determined as condition unacceptable, the information input region to perform display of condition unacceptability or changing a display aspect of the information input region.

7. The information processing device according to claim 1, wherein the controller
adds information about the objects added with the display indicative of condition unacceptability, to operation flow data, the operation flow data being used by the computer to execute the operation flow created based on the arrangement of the objects on the work region, and outputs the operation flow data as data described in a format specified beforehand.

8. The information processing device according to claim 1, wherein the controller
executes, in accordance with an entry accepted by the input unit, a condition setting process configured to set a condition relating to the plurality of operation steps, and
determines whether acceptable or unacceptable by comparison of the plurality of operation steps respectively corresponding to the objects arranged on the work region with the set condition in accordance with the condition set in the condition setting process.

9. The information processing device according to claim 8,
further comprising a storage unit, and
wherein the controller causes the storage unit to store condition definition information indicative of the condition set in the condition setting process.

10. An information processing method of creating an operation flow by an information processing device equipped with a display unit, the operation flow including a plurality of operation steps, and being specified with an order of execution, the information processing method comprising:
causing the display unit to display a work region;
arranging, in accordance with entries, objects indicative of the plurality of operation steps onto the work region;
creating the operation flow based on the arrangement of the objects on the work region;
determining whether acceptable or unacceptable by comparison of the objects arranged on the work region with a condition set with respect to the plurality of operation steps respectively corresponding to the objects;
adding, when unacceptable is determined, a display indicative of condition unacceptability onto each of corresponding ones of the objects; and
continuing, after adding the display indicative of condition unacceptability onto each of the corresponding ones of the objects, arranging the objects onto the work region in accordance with the entries.

11. A non-transitory computer readable medium storing a program for causing a computer equipped with a display unit, to execute a process configured to create an operation flow including a plurality of operation steps, the operation flow being specified with an order of execution, the process comprising:
causing the display unit to display a work region;
arranging, in accordance with entries, objects indicative of the plurality of operation steps onto the work region;
creating the operation flow based on the arrangement of the objects on the work region;
determining whether acceptable or unacceptable by comparison of the objects arranged on the work region with a condition set with respect to the plurality of operation steps respectively corresponding to the objects;
adding, when unacceptable is determined, a display indicative of condition unacceptability onto each of corresponding ones of the objects; and
continuing, after adding the display indicative of condition unacceptability onto each of the corresponding ones of the objects, arranging the objects onto the work region in accordance with the entries as a controller.

* * * * *